(12) United States Patent
Rockwood

(10) Patent No.: US 10,902,675 B2
(45) Date of Patent: Jan. 26, 2021

(54) GRAPHICAL MODELLING BY SMOOTHING POLYHEDRAL MESHES WITH MULTI-SIDED PATCHES

(71) Applicant: Alyn Rockwood, Boulder, CO (US)

(72) Inventor: Alyn Rockwood, Boulder, CO (US)

( * ) Notice: Subject to any disclaimer, the term of this patent is extended or adjusted under 35 U.S.C. 154(b) by 0 days.

(21) Appl. No.: 16/717,645

(22) Filed: Dec. 17, 2019

(65) Prior Publication Data
US 2020/0273246 A1 Aug. 27, 2020

Related U.S. Application Data

(63) Continuation-in-part of application No. 16/283,351, filed on Feb. 22, 2019, now abandoned.

(51) Int. Cl.
*G06T 17/20* (2006.01)
*G06T 5/00* (2006.01)

(52) U.S. Cl.
CPC .............. *G06T 17/20* (2013.01); *G06T 5/002* (2013.01); *G06T 2207/20221* (2013.01)

(58) Field of Classification Search
None
See application file for complete search history.

(56) References Cited

U.S. PATENT DOCUMENTS

| 4,646,251 | A | 2/1987 | Hayes et al. |
| 6,222,553 | B1 | 4/2001 | DeRose et al. |
| 6,271,861 | B1 | 8/2001 | Sargent et al. |
| 9,147,288 | B1 | 9/2015 | Johnston et al. |
| 2004/0085311 | A1* | 5/2004 | Lee .......................... G06T 17/30 345/419 |
| 2014/0184599 | A1 | 7/2014 | Quilot |
| 2014/0354639 | A1 | 12/2014 | Rockwood |
| 2016/0292847 | A1* | 10/2016 | Liu .......................... G06T 19/20 |

OTHER PUBLICATIONS

Kobbelt, L. √ 3-subdivision. In Proceedings of the 27th annual conference on Computer graphics and interactive techniques, ACM Press/Addison-Wesley Publishing Co., 103-112.

(Continued)

*Primary Examiner* — James A Thompson
(74) *Attorney, Agent, or Firm* — MP Patents, LLC

(57) ABSTRACT

A method for smoothing a graphic model includes forming a loop from a plurality of parametrically defined curves and creating a ribbon along each parametrically defined base curve between preceding and subsequent parametrically defined curves of the loop. The ribbons are blended to form a multi-sided surface patch between the parametrically defined curves. A system for smoothing a graphic model includes a curve network module, a lofting module and a blending module. The curve network module, the lofting module and the blending module, are configured to cause a processor to form a loop from a plurality of parametrically defined curves, create a ribbon along each parametrically defined curve between a preceding parametrically defined curve of the loop and a subsequent parametrically defined curve of the loop and blend the ribbons to form a multi-sided surface patch between the parametrically defined curves.

12 Claims, 16 Drawing Sheets

(56) References Cited

OTHER PUBLICATIONS

Weber, T., Wimmer, M., and Owens, J. D. 2015. Parallel reyes-style adaptive subdivision with bounded memory usage. In Proceedings of the ACM SIGGRAPH Symposium on Interactive 3D Graphics and Games.
Catmull, E., and Clark, J. 1978. Recursively Generated B-Spline Surfaces on Arbitrary Topology Meshes. Computer-Aided Design 10, 6, 350-355.
Stam, J. 1998. Exact evaluation of catmull-clark subdivision surfaces at arbitrary parameter values. In Proceedings of the 25th annual conference on Computer graphics and interactive techniques, ACM, 395-404.
200K, R. L., Carpenter, L., and Catmull, E. 1987. The Reyes Image Rendering Architecture. Computer Graphics (Proceedings of SIGGRAPH) 21, 4, 95-102.
D. Doo and M. Sabin: Behavior of recursive division surfaces near extraordinary points, Computer-Aided Design, 10 (6) 356-360 (1978).
Derose, T., Kass, M., and Truong, T. 1998. Subdivision Surfaces in Character Animation. In Proceedings of SIGGRAPH 98, Annual Conference Series, ACM, 85-94.
Niessner, M., Loop, C., Meyer, M., and Derose, T. 2012. Feature-adaptive gpu rendering of catmull-clark subdivision sur-faces. ACM Transactions on Graphics (TOG) 31, 1, 6. https://www.youtube.com/watch?v=uogAzQoVdNU.
Eppstein, D., Goodrich, M. T., Kim, E., and Tamstorf, R. 2008. Motorcycle graphs: Canonical quad mesh partitioning. In Proceedings of the Symposium on Geometry Processing, Eurographics Association, Aire-la-Ville, Switzerland, Switzerland, SGP '08, 1477-1486.
Forsey, D. R., and Bartels, R. H. 1988. Hierarchical b-spline refinement. In ACM SIGGRAPH Computer Graphics, vol. 22, ACM, 205-212.
Gibson, Sarah F., Constrained Elastic Surface Nets: Generating Smooth Models From Binary Segmented Data, Mitsubishi Electric Research Laboratories http://www.merl.com, TR99-24, Dec. 1999.
He, L., Loop, C., and Schaefer, S. 2012. Improving the parameterization of approximate subdivision surfaces. In Computer Graphics Forum, vol. 31, Wiley Online Library, 2127-2134.
Hoppe, H., Derose, T., Duchamp, T., Halstead, M., Jin, H., McDonald, J., Schweitzer, J., and Stuetzle, W. 1994. Piecewise Smooth Surface Reconstruction. In Proceedings of SIGGRAPH, ACM, 295-302.
Schaefer, Scott, et al.; Dual Marching Cubes: Primal Contouring of Dual Grids, Rice University, TX, USA.
Kobbelt, L. 1996. Interpolatory subdivision on open quadrilateral nets with arbitrary topology. In Computer Graphics Forum, 409-420.
Kovacs, D., Mitchell, J., Drone, S., and Zorin, D. 2009. Real-time creased approximate subdivision surfaces. In Proceedings of the 2009 symposium on Interactive 3D graphics and games, ACM, 155-160.
Schafer, H., Niessner, M., Keinert, B., Stamminger, M., and Loop, C. 2014. State of the art report on real-time rendering with hardware tessellation. In Eurographics 2014—State of the Art Reports, EG, 93-117.
Schafer, H., Raab, J., Keinert, B., Meyer, M., Siam-Minger, M., and Niessner, M. 2015. Dynamic feature-adaptive subdivision. In Proceedings of the 19th Symposium on Interactive 3D Graphics and Games, ACM, 31-38.
Loop, C., and Schaefer, S. 2008. Approximating Catmull-Clark subdivision surfaces with bicubic patches. ACM Transac-tions on Graphics (TOG) 27, 1, 8.
Loop, C., Schaefer, S., Ni, T., and Castaño, I. 2009. Approximating Subdivision Surfaces with Gregory Patches for Hardware Tessellation. ACM Trans. Graph. 28, 151:1-151:9.
Lorensen, William E., et al.; Marching Cubes: A High Resolution 3D Surface Construction Algorithm, Computer Graphics, vol. 21, No. 4, Jul. 1987, General Electric Company, NY, USA.
Microsoft Corporation, 2009. Direct3D 11 Features. http://msdn.microsoft.com/en-us/library/ff476342(VS.85) .aspx.
Myles, A., Ni, T., and Peters, J. 2008. Fast parallel construction of smooth surfaces from meshes with tri/quad/pent facets. In Computer Graphics Forum, vol. 27, Wiley Online Library, 1365-1372.
Patney, A., Ebeida, M. S., and Owens, J. D. 2009. Parallel view-dependent tessellation of catmull-clark subdivision surfaces. In HPG '09: Proceedings of the Conference on High Per-formance Graphics 2009, ACM, New York, NY, USA, 99-108.
Shiue, L.-J., Jones, I., and Peters, J. 2005. A realtime gpu subdivision kernel. ACM Trans. Graph. 24, 3, 1010-1015.
Ni, T., Yeo, Y., Myles, A., Goel, V., and Peters, J. 2008. Gpu smoothing of quad meshes. In Shape Modeling and Applications, 2008. SMI 2008. IEEE International Conference on, IEEE, 3-9.
Niessner, M., and Loop, C. 2013. Analytic displacement map-ping using hardware tessellation. ACM Transactions on Graphics (TOG) 32, 3, 26.
Niessner, M., Keinert, B., Fisher, M., Stamminger, M., Loop, C., and Schafer, H. 2015. Real-time rendering techniques with hardware tessellation. Computer Graphics Forum 35, 1, 113-137.
Niessner, M., Loop, C. T., and Greiner, G. 2012. Efficient evaluation of semi-smooth creases in catmull-clark subdivision surfaces. In Eurographics (Short Papers), 41-44.
Thompson, James A., USPTO Final Action, dated Jun. 17, 2019, pp. 1-30.
Thompson, James A., USPTO First Action, dated Apr. 25, 2019, pp. 1-58.
Pixar Animation Studios, 2005. The RenderMan Interface version 3.2.1. index.htm).
Bunnell, M. 2005. Adaptive tessellation of subdivision surfaces with displacement mapping. GPU Gems 2, 109-122.
Brainerd, W. 2016. Catmull-clark subdivision surfaces. In GPU Pro 7: Advanced Rendering Techniques, W. Engel, Ed. A K Peters/CRC Press, Boca Raton, FL, USA.
Loop, C. 1987. Smooth Subdivision Surfaces Based on Triangles. Master's thesis, University of Utah.
Nasri, A. 1987. Polyhedral Subdivision Methods for Free-Form Surfaces. ACM Transactions on Graphics (TOG) 6, 1, 29-73.
Peters, J. R.; Reif, U. (2008). "Subdivision Surfaces". Geometry and Computing 3. pp. 108-125; doi:10.1007/978-3-540-76406-9. ISBN 978-3-540-76405-2.
Pixar Animation Studios, 2005. The RenderMan Interface version 3.2.1.
Joseph D. Warren; Henrik Weimer (2002). Subdivision Methods for Geometric Design: A Constructive Approach. Morgan Kaufmann. ISBN 978-1-55860-446-9.

\* cited by examiner

GRAPHICAL MODELLING BY SMOOTHING POLYHEDRAL MESHES WITH MULTI-SIDED PATCHES

CROSS-REFERENCE TO RELATED APPLICATIONS

This application is a Continuation-in-Part of U.S. Non-Provisional application Ser. No. 16/283,351 filed on Feb. 22, 2019, pending, which is incorporated herein by reference in its entirety.

SUMMARY

The disclosure describes a method for smoothing a graphic model of an isosurface representing a threshold data value includes forming each of a plurality of loops from a plurality of parametrically defined curves, creating a ribbon along each parametrically defined curve between its preceding parametrically defined curve and its subsequent parametrically defined curve and blending the ribbons to form a multi-sided surface patch from each of the plurality of loops.

The disclosure further describes a system for smoothing a graphic model of an isosurface representing a threshold data value includes a memory, a processor operatively coupled with the memory, a curve network module provided to the memory, a lofting module provided to the memory and a blending module provided to the memory.

Still further, the disclosure describes a non-transitory computer readable medium for smoothing a graphic model of an isosurface representing a threshold data value comprising computer readable instructions, when executed by a processor, causes one or more computers to form each of a plurality of loops from a plurality of parametrically defined curves, create a ribbon along each parametrically defined curve between its preceding parametrically defined curve of and its subsequent parametrically defined curve and blend the ribbons to form a multi-sided surface patch from each of the plurality of loops.

BRIEF DESCRIPTION OF THE FIGURES

The summary above, as well as the following detailed description of illustrative embodiments, is better understood when read in conjunction with the appended figures. For the purpose of illustrating the present disclosure, example constructions of the disclosure are shown in the figures. However, the present disclosure is not limited to specific methods and instrumentalities disclosed herein. Moreover, those having ordinary skill in the art will understand that the figures are not to scale. Wherever possible, like elements have been indicated by identical numbers.

Embodiments of the present disclosure will now be described, by way of example only, with reference to the following figures wherein.

DETAILED DESCRIPTION

The following detailed description illustrates embodiments of the disclosure and manners by which they may be implemented. Although the best mode of carrying out the disclosed systems and methods has been described, those of ordinary skill in the art would recognize that other embodiments for carrying out or practicing the present disclosure are also possible.

It should be noted that the terms "first", "second", and the like, herein do not denote any order, quantity, or importance, but rather are used to distinguish one element from another. Further, the terms "a" and "an" herein do not denote a limitation of quantity, but rather denote the presence of at least one of the referenced item. Bold, lower-case letters reflect vector-valued variables.

The disclosure relates generally to the art of designing, modelling and representing surfaces and shapes of objects and, more particularly, to methods for designing and representing shapes that fit input provided in the form of approximating polyhedral meshes. Disclosed methods may be applied to industries including, but not limited to, Internet of Things, advertising, animation, automotive, aerospace, CAD/CAM, product design and computer games.

Conventional methods for 3-dimensional (3D) computer graphics rely either on polygonal or known art tensor product (TP) surfaces like Bezier or B-splines to represent the surface. The polygon methods do not have the smoothness or smaller data size of the TP surface methods and are not used where high quality curved surface representation is required. TP methods, however, suffer from an inability to represent arbitrary topologically connected objects, i.e. they cannot surface arbitrary networks of curves, which are often given as input from designers. For TP surfaces, the networks must have a rectilinear scheme. A TP surface patch requires four sides.

According to known techniques, the cage is transformed to smooth surfaces by the known method of recursive subdivision. The resulting smoothed surface models are useful in animation, CAD/CAM, styling, computer gaming shapes and a myriad of other 3D graphics applications.

FIG. 1 illustrates examples of a smoothed object resulting from recursive subdivision smoothing. Recursive subdivision modeling is commonly used in animation, where the animator can quickly rough out an object by constructing an approximating polyhedral mesh or cage as in FIG. 1A. The mesh is then successively smoothed by chamfering along edges (FIGS. 1B, 1C & 1D). Eventually, smoothed out portions converge to a TP Bezier patch. However, this creates holes around mesh vertices having a number of intersecting edges, or valency, other than four.

Figure 1A:
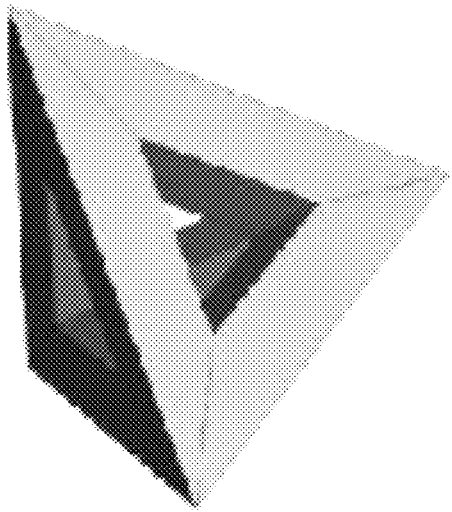
FIGS. 1A-1D illustrates example stages of an example of known recursive subdivision wherein a polyhedral mesh or cage approximates a shape and successive recursions converge on the shape.
Figure 1B:
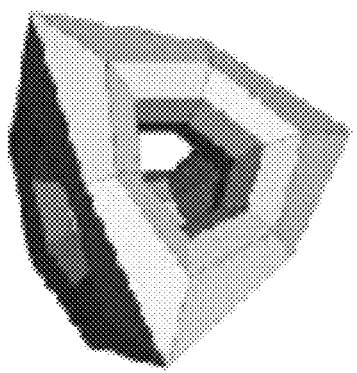
Figure 1C:
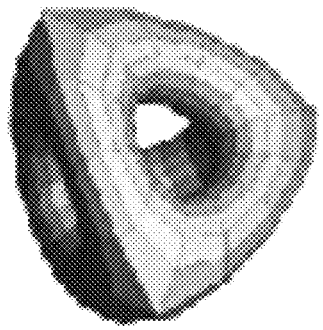
Figure 1D:
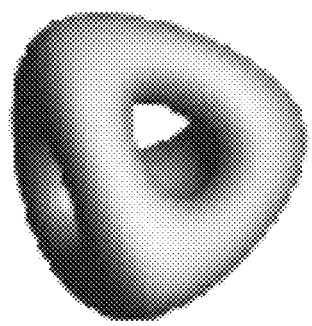
Figure 2:
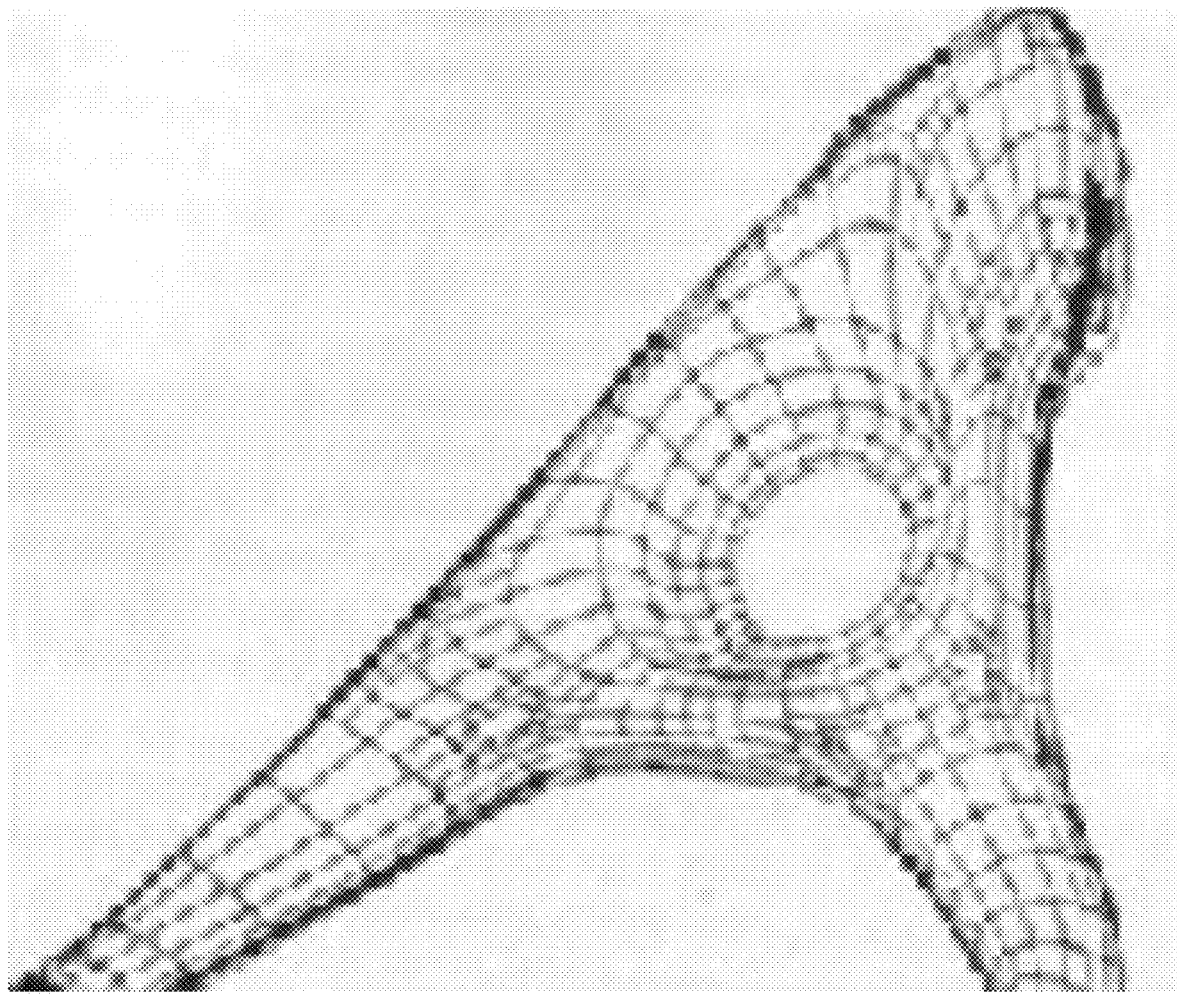
FIG. 2 illustrates an example polyhedral mesh smoothed by a known subdivision surface, exhibiting the plethora of patches around extraordinary vertices.

These holes are filled by recursively fitting smaller TP patches until the hole is too small to be seen (FIG. 2). The result is a plethora of patches around the hole and a so-called extraordinary vertex in the middle of the hole where the smoothness of the surface differs from the surrounding surface which becomes apparent in many modeling situations wherein it is observed as sharp kinks in a reflection. In applications requiring highly smooth or reflective objects these points are undesirable and restrict recursive subdivision modeling from useful implementation. Automobile styling, a ubiquitous application in 3D graphics, is one such application. Further, the plethora of patches adds to the database size and computational burden.

An additional shortcoming of known technologies is that curvature continuity is not provided for. Known N-sided surface patches lack the flexibility necessary to match the N number of curve boundaries with needed continuity orders to neighbors. Thus, resulting surfaces are too convoluted in the interior to be of much use.

As disclosed, the popular recursive subdivision interface can be chosen to drive a natural arrangement of N-sided surface patches for a smoothing scheme that approximates the recursive subdivision modeling experience, but with a reduced database size and without extraordinary vertices. The disclosed approach fills N-sided holes with a novel, N-sided surface technology, enabling recursive-subdivision-type, polyhedral modeling.

In one embodiment, parametric curves, such as Bezier curves, are computed so that the curves' end points lie in the faces of every two adjacent faces which share an edge on the input wireframe cage. Loops of the curves are selected so that the curves cycle the common vertex of the faces. This creates a unique dual relationship between the edge valency of the vertex and the number of curves in the loop. That is, for every vertex in the cage, there exists a unique loop of curves joining the faces that share that vertex.

If N is the number of curves in a loop, the N-sided surface patches are derived to interpolate the curves as boundaries based solely on the boundary curves and their derivatives. Thus, each surface patch can be independently computed from any other. This independent computation offers the advantage of enabling computation on mobile devices and for parallel computing. If the curves in a network of curves meet with $G^2$ continuity, then so will the surfaces. Variations in this design scheme can be achieved by varying the location of end points in the face, or the shape of the curves, or by parameters affecting the generation of the surface.

Disclosed systems and methods avoid the plethora of patches and extraordinary points. The result is a smaller database, faster computation and smoother surfaces that are applicable to a wider range of applications, such as automobile styling. Furthermore, disclosed systems and methods are suitable for parallel programming and streaming computation, which makes for better usage by mobile devices such as smart phones and computer tablets. The smaller number of memory fetches and smaller memory size lessens the demand on mobile memories, resulting in higher speed and decreasing demand on the batteries enabling longer usage between charges. Eliminating recursion enables immediate processing by graphics processing units in parallel thus increasing processing speed.

Disclosed methods and systems generate small databases, and computing is straight line and without branches, or recursion, which streams display triangles to a graphics processing unit thus saving on time and energy consuming memory fetches. In particular, disclosed methods and systems support implementation on mobile devices as well as fast, cloud-based transfer of model information.

In an example, inputs are 3D graphics files, containing vertices and line segments arranged in a data structure. The collection of vertices and line segments with any additional structures may be referred to as a polyhedral mesh or a cage. Again referring to FIG. 1, an input cage or polyhedral mesh roughly approximates a desired shape.

Figure 3:
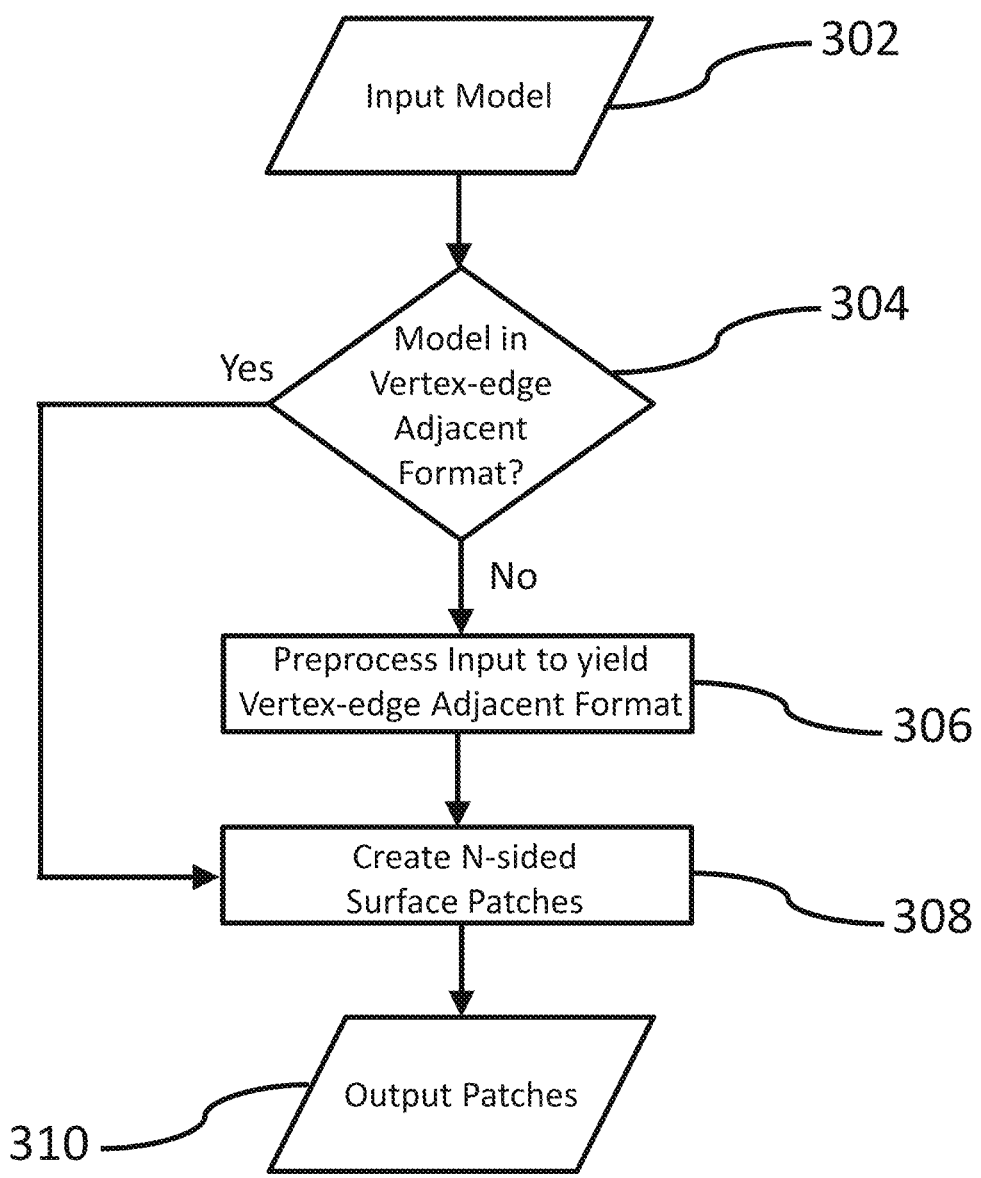
FIG. 3 illustrates an example mid-level flow of a method for smoothing polyhedral meshes.

A flow for a processing stage of a method for smoothing a graphic model is shown by way of example in FIG. 3. After input of a graphics file, at 302, it is determined, at 304, whether the input is in a structure suitable for fast processing. Suitable structures include connection information between vertices, edges and faces of the input cage, for example, winged edge and/or half-edge format.

If it is determined at 304 that the input does not include connection information between vertices, edges and faces of the input cage or is otherwise unsuitable for fast processing, the data is processed by known techniques (or those disclosed below) at 306 into a suitable format. Such reformatting speeds up later processing. At 308 an N-sided surface patch is created from the cage. The surface patch may be stored, or further processed into display polygons. At 310 either the surface patch or the polygon file is output to any of a variety of output devices.

Figure 4:
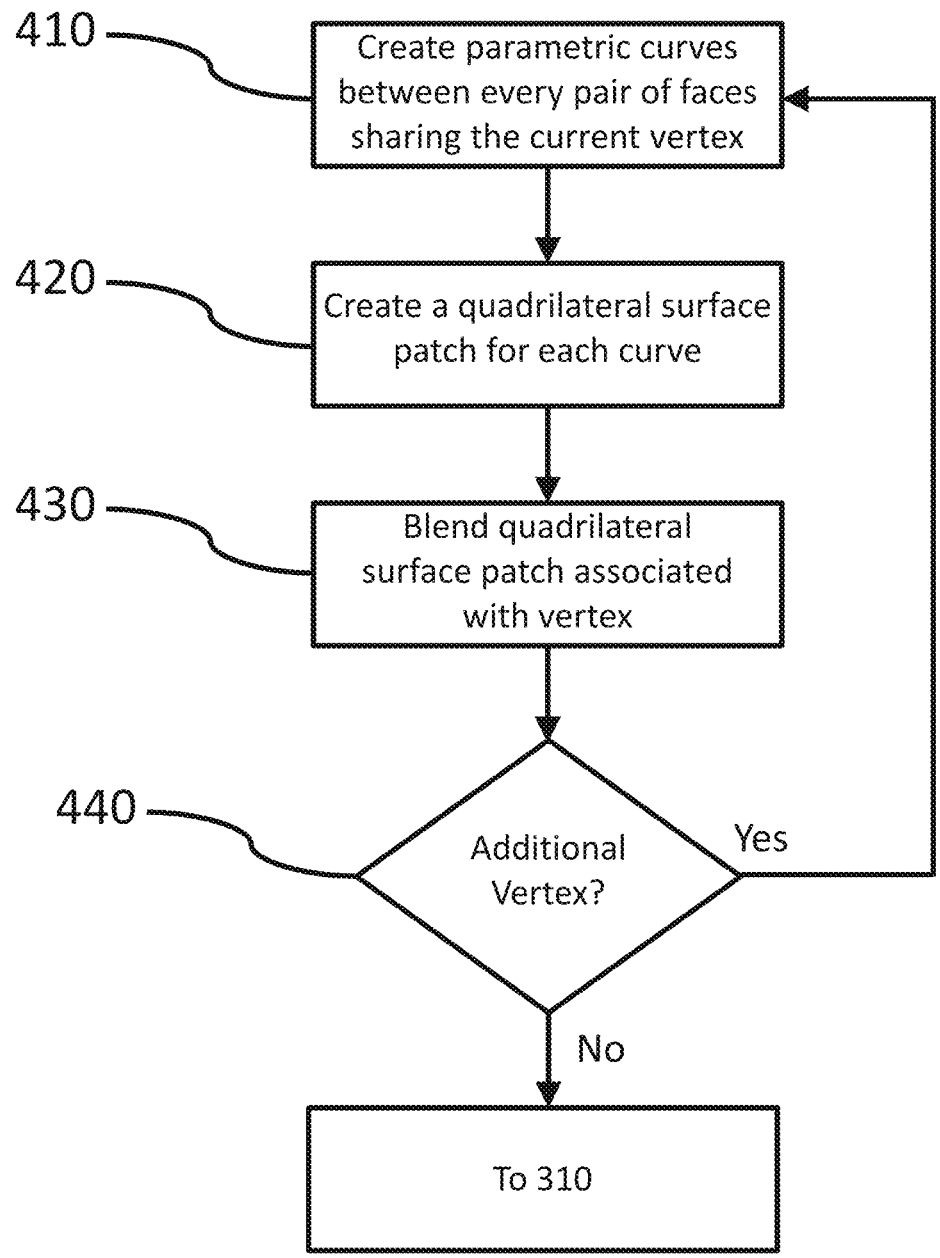
FIG. 4 illustrates a detailed flow of an example action creating N-sided surface patches.

FIG. 4 illustrates a flow of action 308 of FIG. 3 in greater detail by way of example only. A method for smoothing a graphic model in accordance with the disclosure includes forming a loop from a plurality of parametrically defined curves at 410, creating a ribbon along each parametrically defined curve between a leading or preceding parametrically defined curve of the loop and a following or subsequent parametrically defined curve of the loop at 420 and blending the ribbons to form a multi-sided surface patch between the parametrically defined curves at 430. In an example, the method may be implemented by one or more computing devices including but not limited to mobile devices such as tablets and smart phones.

The loop is formed from a plurality of parametrically defined curves that provide the boundaries of the N-sided surface patches. The curves are defined using a polyhedral mesh of the graphic model as input, as mentioned above. In an example, the polyhedral mesh input is configured for recursive subdivision. Suitable input formats include but are not limited to .3ds, .max, .blend, .c4d, .dae, .dxf, .dwg, .dwf, .fbx, .jt , .lwo, .lxo, .mb and .ma, .md2, .md3, .mdl, .nif, .obj, .ply, .rwx, .stl , .u3d, .wrl and combinations of these.

Each of the plurality of parametrically defined curves are constructed between center points of polygons of the polyhedral mesh which have a common edge. Each loop is formed from a number of curves equal to a count of the polygon center points. For each vertex, for each edge coincident with that vertex, the centers of the two faces from the cage that coincide at that edge are computed as the average of vertices of each face. Each curve is constructed with endpoints equal to centers of polygons of the polyhedral mesh such that each curve joins center points of the polygons. There are N number of edges at the given vertex. Therefore there are N number of curves forming a loop connected at curve endpoints.

Loops may additionally or alternatively be constructed according to other techniques. For example, the curves may interpolate other points on or near the faces rather than face center points. In another example, the curves may be forced to be cotangent at the endpoints with the faces to which they interpolate.

The action of forming the loop is repeated until the number of loops formed is equal to the number of vertices defined by the polyhedral mesh input. As such, there is a duality between every vertex of the polyhedral mesh and the subsequently generated N-sided surface patches such that vertices and surface patches have a one-to-one relationship. The edge valency of the vertex determines the number N of sides of the N-sided surface patch.

Any of a variety of curve types may be found suitable for forming the loop including but not limted to piecewise linear, NURBS, B-splines, Hermite, Catmull-Rom, beta splines, gamma-splines, T-splines, nu-splines, power, conics, conic splines, exponential, rational Gaussian, trigonometric or any combination of these. In an example, the parametrically defined curves forming the loop are Bezier curves and include a third control point a midpoint of the edge joining the faces with connected center points.

The method further includes, from the loop of parametrically defined curves, creating a ribbon for each of the parametrically defined curves at 420. In an example, a ribbon may also be referred to as a lofted surface or a ribbon.

Figure 5:
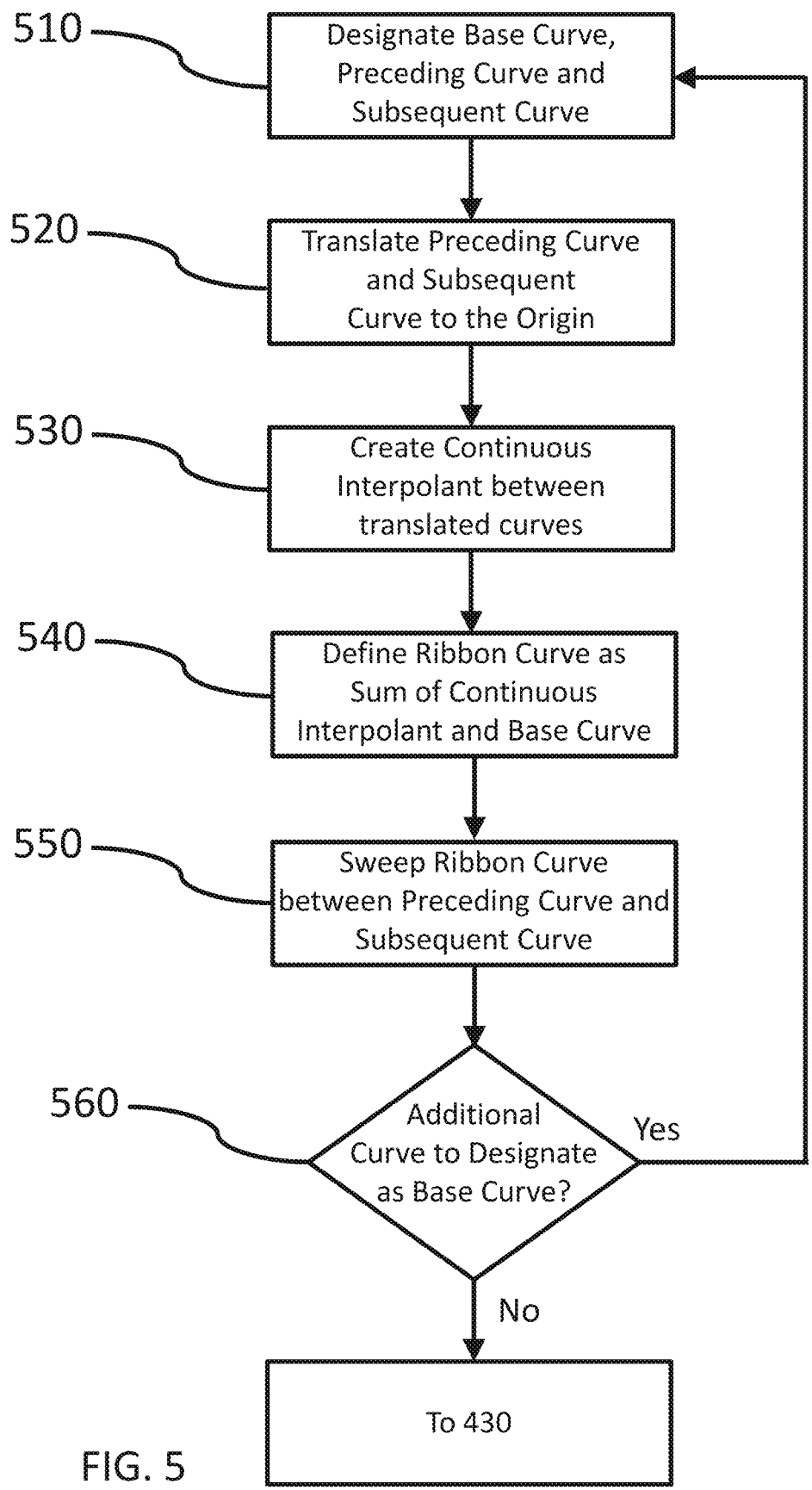
FIG. 5 illustrates a detailed flow of an example method for creating ribbons.

Referring to FIG. 5, creating the ribbon may further include, for each curve of the loop, designating that curve as a base curve relative to the ribbon, the preceding curve and the subsequent curve at 510. In one example, for a given base curve $C_i$ in the loop, where $C_{i-1}$ and $C_{i+1}$ are the preceding and subsequent curves, respectively, a process for producing a ribbon is as follows.

With all curves in Bezier form, $s_i$ is established as the starting point for $C_i$ and $e_i$ is established as the ending point for $C_i$. The end point of the preceding curve is the same as the starting point on the base curve while the starting point of the subsequent curve is the same as the end point of the base curve. The preceding curve $C_{i-1}$, i.e., Bezier control points, is/are translated to the origin at 520 by subtracting the starting point $s_i$, and the subsequent curve $C_{i+1}$ is translated to the origin by subtracting the ending point $e_i$.

Creating the ribbon may include computing a point on the ribbon as a function of any parameter along each parametrically defined curve and interpolating between the preceding curve of the loop and the subsequent curve of the loop by blending the preceding curve and the subsequent curve. A continuous interpolant is computed at 530 from the preceding and subsequent curves as translated to the origin. For any given value or parameter point t, such that $C_i(t)$ $t_0<=t<=t_1$ and $C_i(t_0)=s_i$ and $C_i(t_1)=e_i$, a continuous interpolant $C_i t$ is computed from the preceding curve $C_{i-1}-s_1$ to the subsequent curve $C_{i+1}-e_1$ for the parameter point t.

At 540 a ribbon curve or quadrilateral surface curve $R_i t(s)$ is defined at a parameter point t as a sum of the continuous interpolant $C_i t$ and the base curve $C_i(t)$ such that $R_i t(s)=C_i t(s)+C_i(t)$.

A ribbon is produced for each curve of each face of the N-sided surface patch yielding N number of ribbons for each loop. The ribbon $S_i(s,t)$ for the base curve $C_i(t)$, a parameteric surface, is defined as the loft of the quadrilateral surface curve $R_i t(s)$ as it is swept along the base curve $C_i(t)$ at 550. A ribbon is generated for each of the number N boundary curves of the loop of curves, i.e. N ribbons that interpolate the preceding and subsequent curves as well as the $i^{th}$ boundary curve $C_i$. When it is determined, at 560, that all curves of the loop have been individually designated as base curves and corresponding ribbons formed, the method returns to action 430 of FIG. 4.

Figure 6:
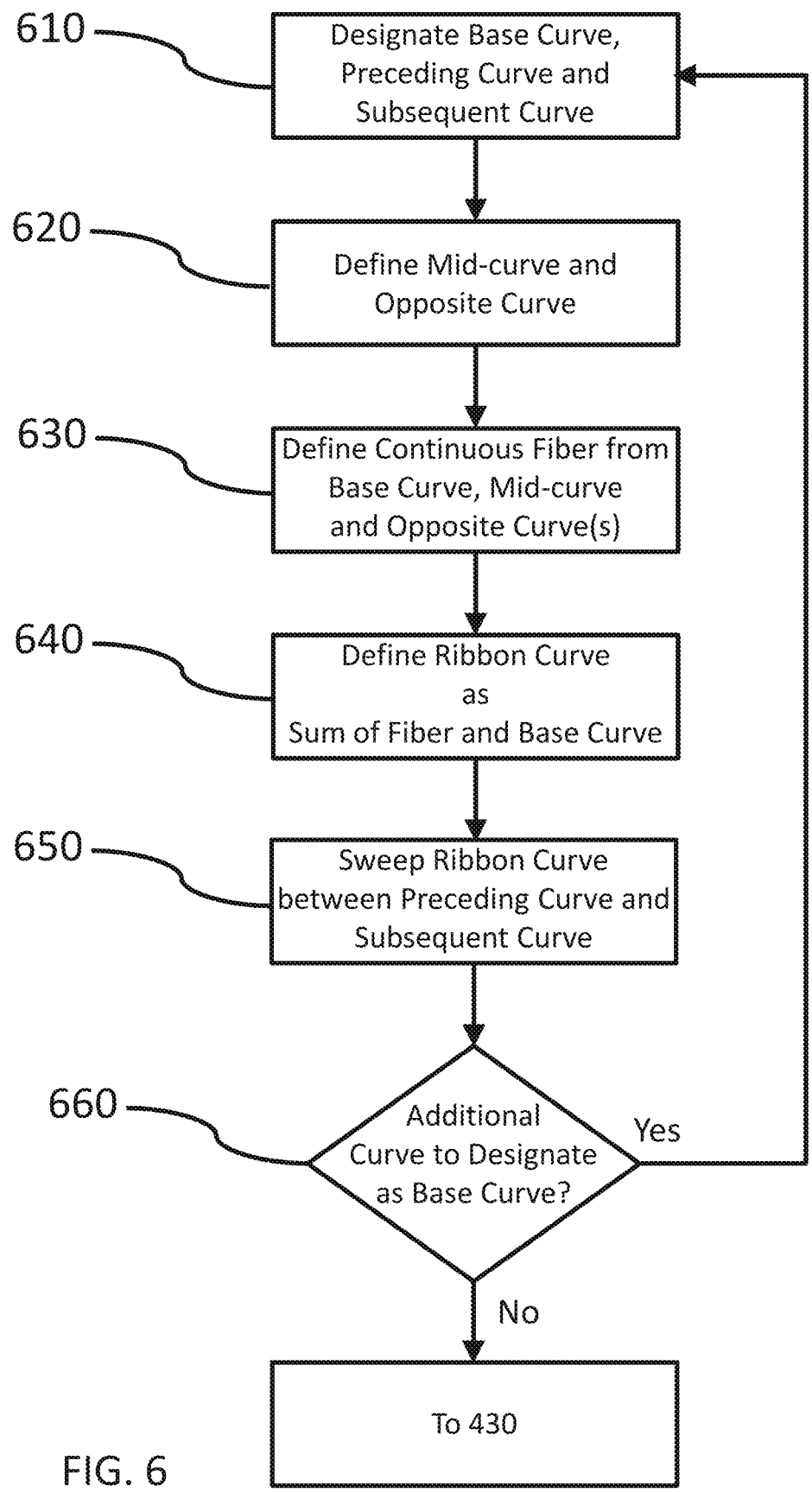
FIG. 6 illustrates a detailed flow of another example method for creating ribbons.

Referring to FIG. 6, in another embodiment for forming ribbons, for each base curve designation $C_i(t)$ at 610, a mid-curve $MC_i(t)$ is produced at 620 using, as control points, a midedge control point of the preceding curve, a midedge control point of the following curve and the vertex of the wireframe surrounded by the curve. Further, an opposite curve $OP_i(t)$ is produced. In the case that the curve loop includes four curves, the opposite curve $OP_i(t)$ is simply the curve opposite the base curve. In the case that the curve loop includes only three curves, the opposite curve $OP_i(t)$ becomes the single point at the center of the wireframe surface opposite the base curve. In the case that the curve loop includes five curves, the opposite curve $OP_i(t)$ is defined by the union of the control points of the i+2 and i−2 curves of the loop.

To yield a better fit to the input surface, the base curve, the mid-curve and the opposite curve are degree-adjusted. For example, when three control points have been used, the degree is elevated to five. The two added control points (referred to as point two and point four) are then moved so that the five control points define a circular arc. Degree-elevating and moving of control points two and four yields a circular arc for each of the base curve, the mid-curve and the opposite curve. When the opposite curve is a point, no degree-adjustments are made. When the opposite curve is a curve of the loop it will also be degree-adjusted to five and second and fourth control points will be moved. When the opposite curve is formed from the union of control points of curves i+2 and i−2 degree-adjustment is unnecessary. However, the second and fourth control points are nevertheless moved to yield a circular arc through the five control points.

At 630 ribbon fibers $F_i t(s)$ are defined between the parameterized base curve $C_i(t)$, the parameterized mid-curve $MC_i(t)$ and the opposite curve $OP_i(t)$ at each t between zero and one. The dimension of the fiber is s along the dimension of the base and mid curves (t). The fiber may then be degree-adjusted to the degree corresponding with that of the related base, mid- and opposite curves. For example, the fiber is degree-elevated from degree three to degree five.

At 640 a ribbon curve or quadrilateral surface curve $R_i t(s)$ is defined at a parameter point t as a sum of the fiber $F_i t(s)$ and the base curve $C_i(t)$ such that $R_i t(s)=F_i t(s)+C_i(t)$. The ribbon or quadrilateral surface is then formed at 650 from sweeping the ribbon curve $R_i t(s)$ across t similar to the above-described ribbon curve. When it is determined at 660 that all curves of the loop have been individually designated as base curves for the purposes of ribbon formation, the method returns to action 430 of FIG. 4.

At 430, ribbons resulting from action 420 are blended. Blending the ribbons may include computing a weighted sum of the ribbons. In an example, computing a weighted sum of the ribbons includes weighting parameter points of the ribbons according to distances of those parameter points from each of the plurality of parametrically defined curves.

A relation describing an example blending computation may be represented as:

$$S(s,t)=\Sigma_{i=N} W_i(d_i(s,t))R_i(s,t), \quad \text{Eqn 1}$$

where $d_i(s,t)$ measures a distance from an (s,t) parameter point to the $i^{th}$ curve of the loop of curves.

The weight function $W_i$ ensures that when the point (s,t) is close to $i^{th}$ curve of the loop of curves, then the defined function S(s,t) is close to the $i^{th}$ curve of the loop of curves. The surface S(s,t) interpolates the curves in the curve loop. With proper choices of the weight function, the surface S(s,t) will also interpolate the slope.

One example, without implied limitations, is to choose a weight function:

$$W_i(d_i(s,t)) = \frac{1}{d_i(s,t)^p} \bigg/ \left( \sum_{j=N} \frac{1}{d_i(s,t)^p} \right) \qquad \text{Eqn 2}$$

In other words, for a given point on each ribbon, the method computes a product from the reciprocal of a distance from the given parameter point to the base curve of each ribbon and the reciprocal of the sum of the reciprocals of distances from the given parameter point to base curves of each other ribbon.

$W_i(d_i(s,t))$ in Eqn 2 is zero when the parameter point (s,t) is on the $i^{th}$ boundary, but the sum equals 1 for all indices j≠i. This enforces the interpolation of the surface to the boundaries. It also yields the partition of unity property which may be useful for returning planar shapes when the inputs all lie in the plane. The constant p is an exponent for the distances.

The method calculates a weighted blend of ribbons by a sum of weights, such that each weight is computed by $W_i(d_i(s,t))=1/d_i(s,t)^p/(\Sigma_{j=1\ldots N,\ j\neq i}1/d_j(s,t)^p)$, where the weight $W_i(d_i(s,t))$ is 1 when a parameter point (s,t) is on the $i^{th}$ curve; the sum of the weights equals 1; the $d_i(s,t)$ is a measure of distance to the $i^{th}$ curve of the loop; and the exponent p is any number.

The distances of the parameter points are defined relative to distances measured between points in a fundamental polygon and sides of the fundamental polygon. For example, $d_i(s,t)$ may be a parameterization and/or transformation of a distance $d_i$ from a parameter point (u,v) within a fundamental polygon to an edge of the fundamental polygon and may be related to $d_i$ by a function $g(d_i)$. In an example, $$d_i(u,v) = \frac{\prod_{j\neq i} d_j}{\sum_{j=1}^N \prod_{j\neq k} d_k} \qquad \text{Eqn 3}$$

In an example, distances between points in the fundamental polygon and the sides of the fundamental polygon are computed according to an algebraic method. In a further example, the algebraic method is a linear algebraic method. The points at which the distances are measured may be obtained by triangulating the fundamental polygon according to a desired precision. The fundamental polygon is selected so as to have a number of sides equal to the number of parametrically defined curves of the loop. Suitable fundamental polygons include both regular and irregular polygons.

With the quadrilateral surfaces blended into a multi-sided patch, it is determined at 440 whether untreated vertices remain. When a surface patch has been formed for each vertex of the input polyhedral cage, the method returns to action 310 of FIG. 3 wherein patches are output.

Figure 7:
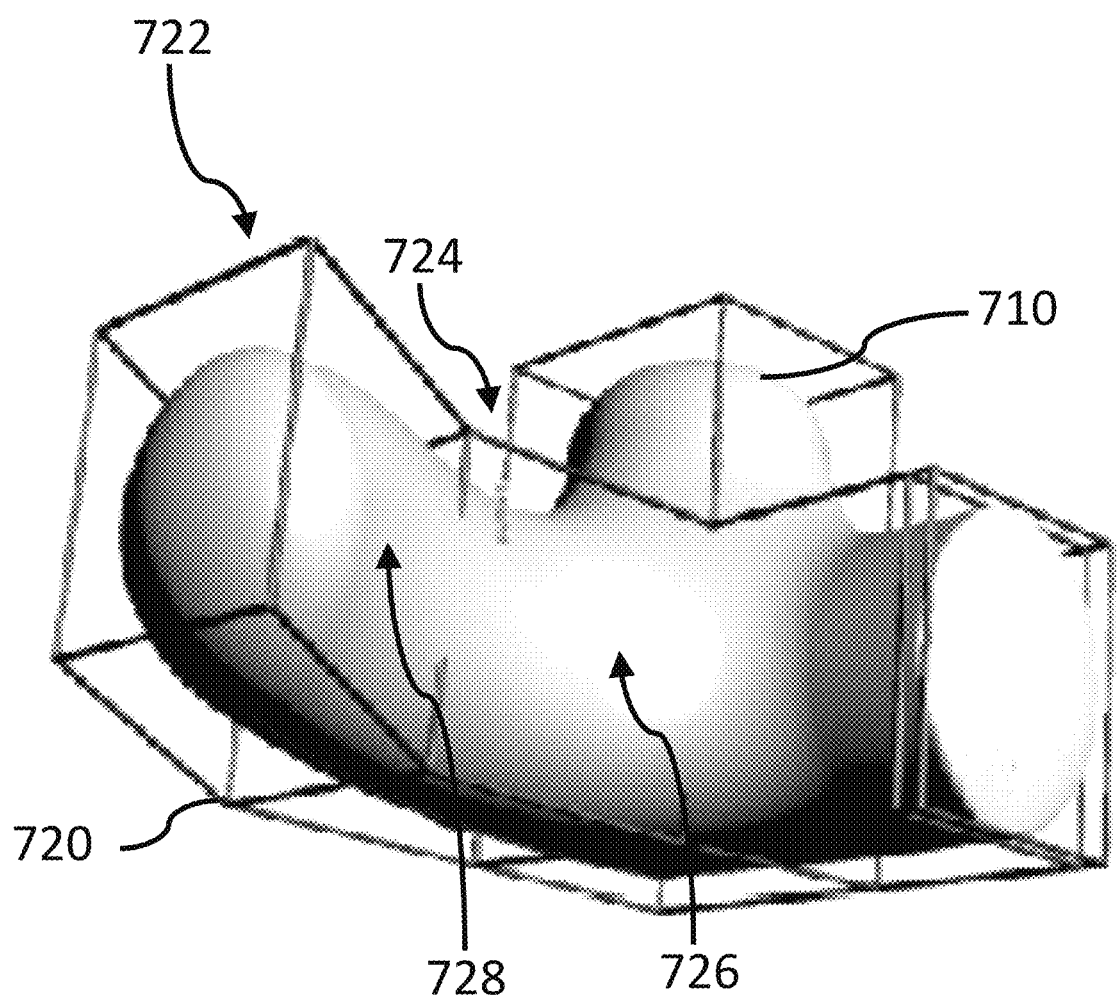
FIG. 7 illustrates an example simple polyhedral mesh from recursive subdivision modeling which approximates the displayed surface.
Figure 8:
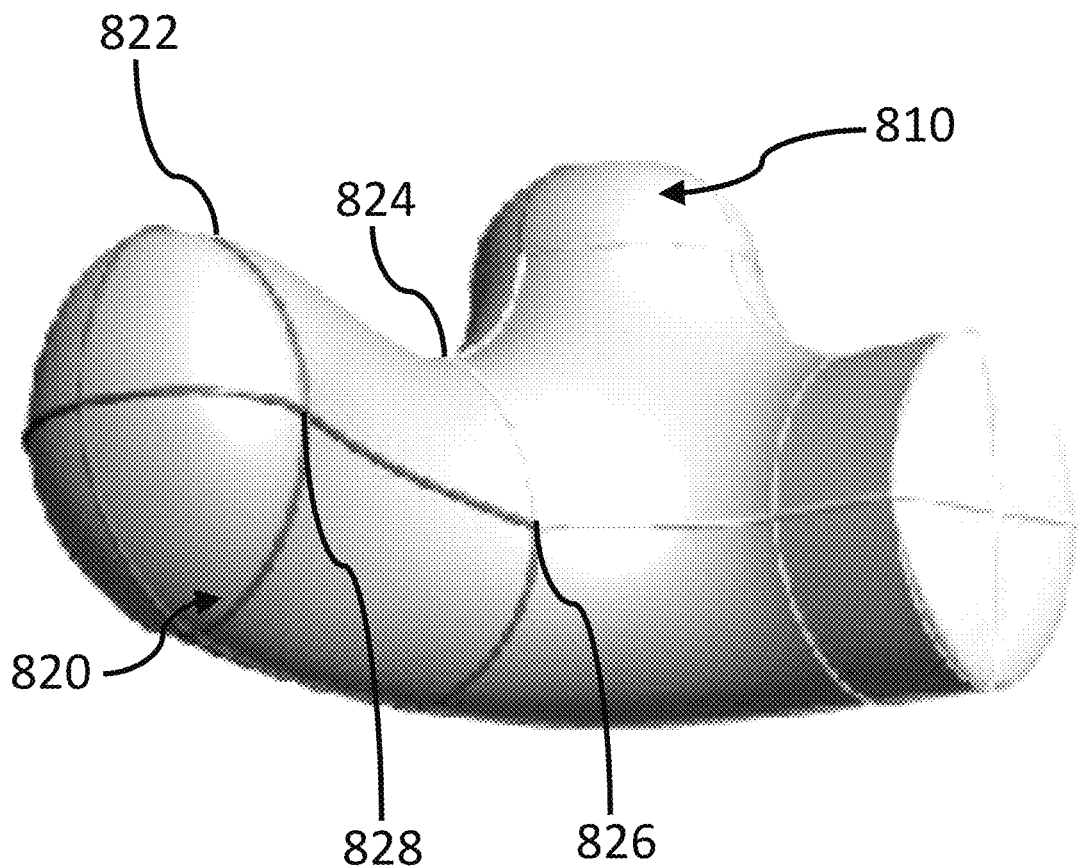
FIG. 8 illustrates example curves and example N-sided surface patches resulting from disclosed methods and systems.

Disclosed methods employing Eqn 1, Eqn 2 and Eqn 3 produce the examples in FIGS. 7 & 8. FIG. 7 illustrates an input polyhedral cage 720 as line segments surrounding a graphic model 710. FIG. 8 illustrates the resulting surface patches of FIG. 7 and the patch boundaries as curves 820 interpolating the cage face centers and the patches. Three-, four-, five- and six-sided surface patches may be observed. An example four-sided patch has vertices at 822, 824, 826 and 828 which are derived from the centers of faces 722, 724, 726 and 728 (FIG. 7), respectively. The surface patches are all infinitely smooth within the boundaries unlike with previous subdivision methods in which all but the four-sided patches would contain extraordinary points which lack continuous curvature. Advantageously, the disclosed systems and methods preserve curvature continuity between surface patches with the appropriate choice of exponent p in Eqn 2 such that p>1.

The small database, the independence of calculation and the rational polynomial form of Eqn 1 facilitate computing on mobile devices that rely on CPU/GPU combinations and small numbers of memory fetches. Runtime experiments show favorable calculation results on mobile devices. For example, the models in FIGS. 6 & 7 can be computed in seconds.

Figure 9:
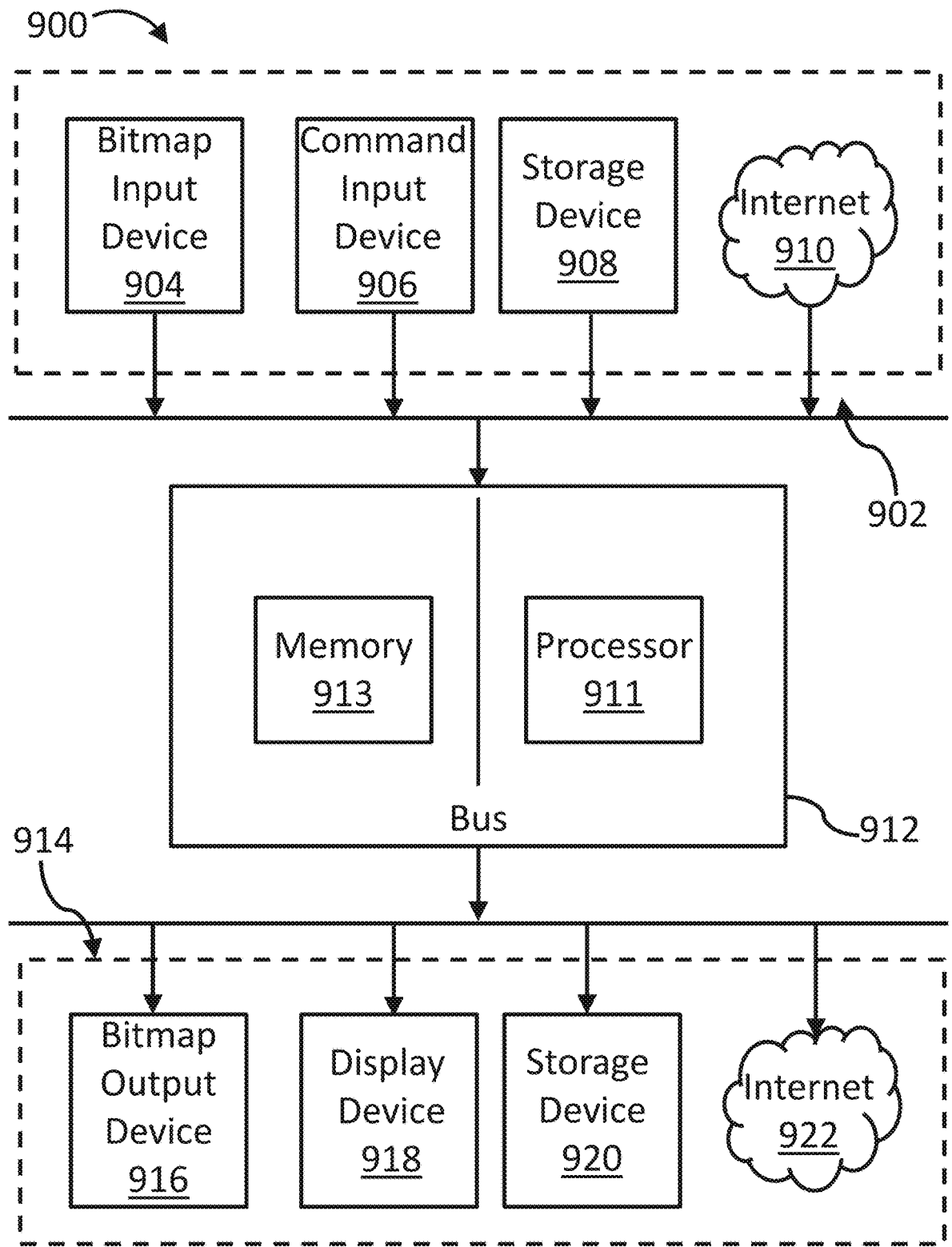
FIG. 9 schematically illustrates an example system for smoothing a graphic model.

FIG. 9 is a schematic illustration of various components of a system for smoothing a graphic model, in accordance with an embodiment of the disclosure. System 900 is suitable for implementing various methods for smoothing a graphic model including those disclosed above. System 900 includes an input subsystem 902, a computing device 912 and an output subsystem 914 and is configured to, from a polyhedral mesh, generate a network of curves comprising loops of curves and to generate one or more N-sided surfaces from the loops of curves using a weighted blend of ribbons created by interpolating to one or more curves of the loops.

Computing device 912, which may be a mobile device or a mobile computing device, includes a processor 911 and a non-transitory memory component 913 operatively coupled with processor 911. Non-transitory memory component 913 has, recorded thereto, computer readable instructions configured to cause processor 911 to form a loop from a plurality of parametrically defined curves, to designate a curve of the loop a base curve and create a ribbon therealong between a preceding curve and a subsequent curve and to blend the ribbons to form a multi-sided surface patch between the parametrically defined curves. The computer readable instructions may be recorded to memory 913, for example, after download from a server over a communications network such or over a wire or may be recorded to memory 913 at time of manufacture or distribution.

Device 912 may be coupled in communication with a server via a communication network which could be a collection of individual networks, interconnected with each other and functioning as a single large network. Such individual networks may be wired, wireless, or a combination thereof. Examples of such individual networks include, but are not limited to, Local Area Networks (LANs), Wide Area Networks (WANs), Metropolitan Area Networks (MANs), Wireless LANs (WLANs), Wireless WANs (WWANs), Wireless MANs (WMANs), the Internet, second generation (2G) telecommunication networks, third generation (3G) telecommunication networks, fourth generation (4G) telecommunication networks, and Worldwide Interoperability for Microwave Access (WiMAX) networks.

Examples of devices usable with or as part of disclosed systems and methods as device 912 and suitable for testing as herein disclosed include, but are not limited to, mobile phones, smart telephones, Mobile Internet Devices (MIDs), tablet computers, Ultra-Mobile Personal Computers (UMPCs), phablet computers, Personal Digital Assistants (PDAs), wearable computing devices such as smart watches, web pads, Personal Computers (PCs), handheld PCs, laptop computers, desktop computers, Network-Attached Storage (NAS) devices, large-sized touch screens with embedded PCs, and interactive entertainment devices, such as game consoles, Television (TV) sets and Set-Top Boxes (STBs).

Optionally, device 912 may access a server to download one or more computer program products associated with the graphic model smoothing service. In an example implementation, device 912 may be coupled to a server periodically or randomly from time to time, for example, to receive updates therefrom and/or to upload collected data or status thereto.

Users such as information technology resource providers, advertisers, marketers, animators, automotive engineers and/or designers, aerospace engineers and/or designers, CAD/CAM professionals, product designers, and computer game designers and/or users may use the graphic model smoothing service and associated systems and methods.

Furthermore, the graphic model smoothing service can be offered free of cost or can be a paid service such as that with subscription-based billing or a transaction-based billing, such as pay-per-use and pay-per-feature.

It is to be understood that the specific description for system 900 is provided as an example and is not to be construed as limiting the system to specific numbers, types, or arrangements of data processing units, mobile computing devices, input stages, output stages, servers, databases and/or communication networks. A person having ordinary skill in the art will recognize many variations, alternatives, and modifications of embodiments of the disclosure.

An input subsystem 902 receives input from one or more input devices. Example input devices include but are not limited to a bitmap input device 904, a command input such as a keyboard, voice recognition or mouse selection 906, a storage device such a disk or memory 908 or the Internet 910. An example mouse or joystick is operable to receive inputs corresponding to clicking, pointing, and/or moving a pointer object on a graphical user interface. An example keyboard is operable to receive inputs corresponding to pushing certain buttons on the keyboard. Voice recognition may be enabled, in part, by a microphone for receiving an audio input from the user. A wireless interface component and/or a network interface component enable receipt of source files, unsmoothed graphics files, program code or databases from the internet or other communication network. Example storage devices include but are not limited to disks, flash memory cards, memory sticks, or smart cards. In a particular example, system 900 takes as input standard three-dimensional polygon file formats, e.g., those with suffix endings .obj, .ply, .fae, .stl and so forth.

Computing device 912, in cooperation with input subsystem 902 and output subsystem 914, may be configured to implement the methods described above with respect to FIGS. 3-6.

Computing device 912 may further include but is not limited to a graphics processing unit, input ports for coupling with input devices of input subsystem 902, output ports for coupling with input devices of output subsystem 914 and a configuration of sensors. Computing device 912 also includes a power source for supplying electrical power to the various components. The power source may, for example, include a rechargeable battery.

Memory 913 optionally includes non-removable memory, removable memory, or a combination thereof. Non-removable memory, for example, includes Random-Access Memory (RAM), Read-Only Memory (ROM), flash memory, or a hard drive. Removable memory, for example, includes flash memory cards, memory sticks, or smart cards. Memory 913 stores applications including, for example, parts of a computer program product associated with the disclosed graphic model smoothing service provided by system 900.

In an example, device 912 includes one or more modules configured to perform actions of the above-described methods in cooperation with processor 911. Example modules may be implemented as a computer program product recorded to memory 913, by hardware operatively coupled with processor 911 and/or memory 913 or may be implemented as a combination of these.

A curve network module, when executed by processor 911, is configured to form a loop from a plurality of parametrically defined curves. The curve network module may be configured to form the loop from a polyhedral mesh of the graphic model. In an example, the polyhedral mesh is configured for recursive subdivision.

Each of the plurality of parametrically defined curves may be constructed by the curve network module between polygons of the polyhedral mesh which have a common side. For example, each curve may be formed between center points of the polygons. In an example, the loop is formed from a number of curves equal to a count of the center points. In another example, the number of loops formed is equal to the number of vertices defined by the polyhedral mesh.

A lofting module, when executed by processor 911, is configured to, for each curve of the loop, designate that curve a base curve and create a ribbon along the base curve between a preceding curve of the loop and a subsequent curve of the loop. In creating the ribbon, the lofting module is configured to, along each parametrically defined base curve, interpolate between the preceding curve of the loop and the subsequent curve of the loop.

In another embodiment, the lofting module may form a ribbon fiber as described with reference to FIG. 6 and sweep the ribbon fiber along the base curve to yield a ribbon.

A blending module, when executed by processor 911, is configured to blend the ribbons to form a multi-sided surface patch between the parametrically defined curves. The blending module may be configured to blend the ribbons by computing a weighted sum of the ribbons. In an example, the weighted sum may be computed by weighting parameter points of the ribbons according to distances of the parameter points from each of the plurality of parametrically defined curves. In a further example, the distances of the parameter points are defined by the blending module relative to distances measured between points in a fundamental polygon and sides of the fundamental polygon. The points in the fundamental polygon may be determined by triangulating the fundamental polygon according to a desired precision. Alternatively or additionally, the points in the fundamental polygon may be determined according to cloud of points, edges, quadratic patches, or normal techniques.

The distances between the points in the fundamental polygon and the sides of the fundamental polygon may be computed according to any of a variety of methods including but not limited to Euclidean, stellated, elliptical and algebraic methods. Algebraic methods include but are not limited to linear algebraic methods.

An interface module generates and renders a graphical user interface on a display screen operably coupled with one or more output ports of the computing device 912. The graphical user interface is configured to facilitate user interactions with the graphic model smoothing system and associated methods and services. In some examples, the display screen may be a touch-sensitive display screen that is operable to receive tactile inputs from the user. These tactile inputs may, for example, include clicking, tapping, pointing, moving, pressing and/or swiping with a finger or a touch-sensitive object like a pen. Various functions of the graphic model smoothing system and service may be accessed and or controlled through the tactile inputs.

A results stage 914 sends results to one or more of the output devices. Example output devices include but are not limited to a bitmap output device 916 such as a printer; a display device 918 such as a monitor or projector; a storage device 920 such as a memory or disk; or the internet 922. The user interface in conjunction with a display device may be configured for displaying or otherwise presenting images representing one or more graphic models and/or smoothed graphic models. Output to the display device may include text, colors, shapes or a combination of these. A wireless interface component and/or a network interface component enable distribution of source files, unsmoothed graphics files, program code or databases to the internet or other communication network. Additionally or alternatively, the output subsystem may include a speaker for providing an audio output to the user.

Additionally, the computer program product, when executed on processor 911, may store output from processor 911 in memory 913. Such output may, for example, include at least one of a raw graphic model, a smoothed graphic model, execution duration and file sizes.

Furthermore, a network interface optionally enables device 912 to upload output from processor 911, such as that stored to memory 913, to a server, for example, via a communication network. Additionally, a network interface may enable device 912 to access a server to update the computer program product and/or download one or more new computer program products associated with the graphic model smoothing system and/or service. Moreover, the network interface and/or a wireless interface optionally allow device 912 to communicate with other devices and data processing units via, for example, a communication network.

FIG. 9 is merely an example, which should not unduly limit the scope of the claims herein. It is to be understood that the specific designation for device 912 is provided as an example and is not to be construed as limiting device 912 to specific numbers, types, or arrangements of modules and/or components of device 912. A person having ordinary skill in the art will recognize many variations, alternatives, and modifications of embodiments of the disclosure.

Scientific, medical, and engineering data are often given as values at the vertices of a grid or lattice. To visualize or model such 'discrete' data, a smooth 3D function may be created that interpolates or approximates such values. To display or investigate the 3D function, a threshold surface, or isosurface is defined, using common, well-known geometries such as polygons or B-splines, which can be then used in many other applications, e.g., analysis or fabrication. Maintaining accuracy with the original data, model size, numerical errors, visual artifacts, and misaligned topology between the lattice and geometry of representation all present challenges to this approach.

In addition to the above-described advantages, disclosed systems, methods and computer program products improve 3D function representation and isosurface construction from discrete data through use of novel N-sided surface patches that match topologies, allow tangent continuity between patches, increase accuracy, promote parallel processing, and minimize model size. Disclosed techniques generate the needed inputs to combine the N-sided patches with well-known and widely used discrete data formats such as Marching Cubes, Surface Nets and Dual Contouring. One of the embodiments defines a 3D function for interpolating the data.

A method for smoothing a graphic model of an isosurface representing a threshold data value includes forming each of a plurality of loops from a plurality of parametrically defined curves, creating a ribbon along each parametrically defined curve between its preceding parametrically defined curve and its subsequent parametrically defined curve and blending the ribbons to form a multi-sided surface patch from each of the plurality of loops. A plurality of the multi-sided surface patches may then be displayed together to render a portion of the isosurface which enables parallel processing.

Each of the plurality of parametrically defined curves is constructed from a first point of intersection of an edge of a cell of the lattice by the isosurface along a first direction defined by a first intersection tangent vector to a second, neighboring point of intersection of another edge of the data cell by the isosurface along a second direction defined by a second intersection tangent vector.

Figure 10:
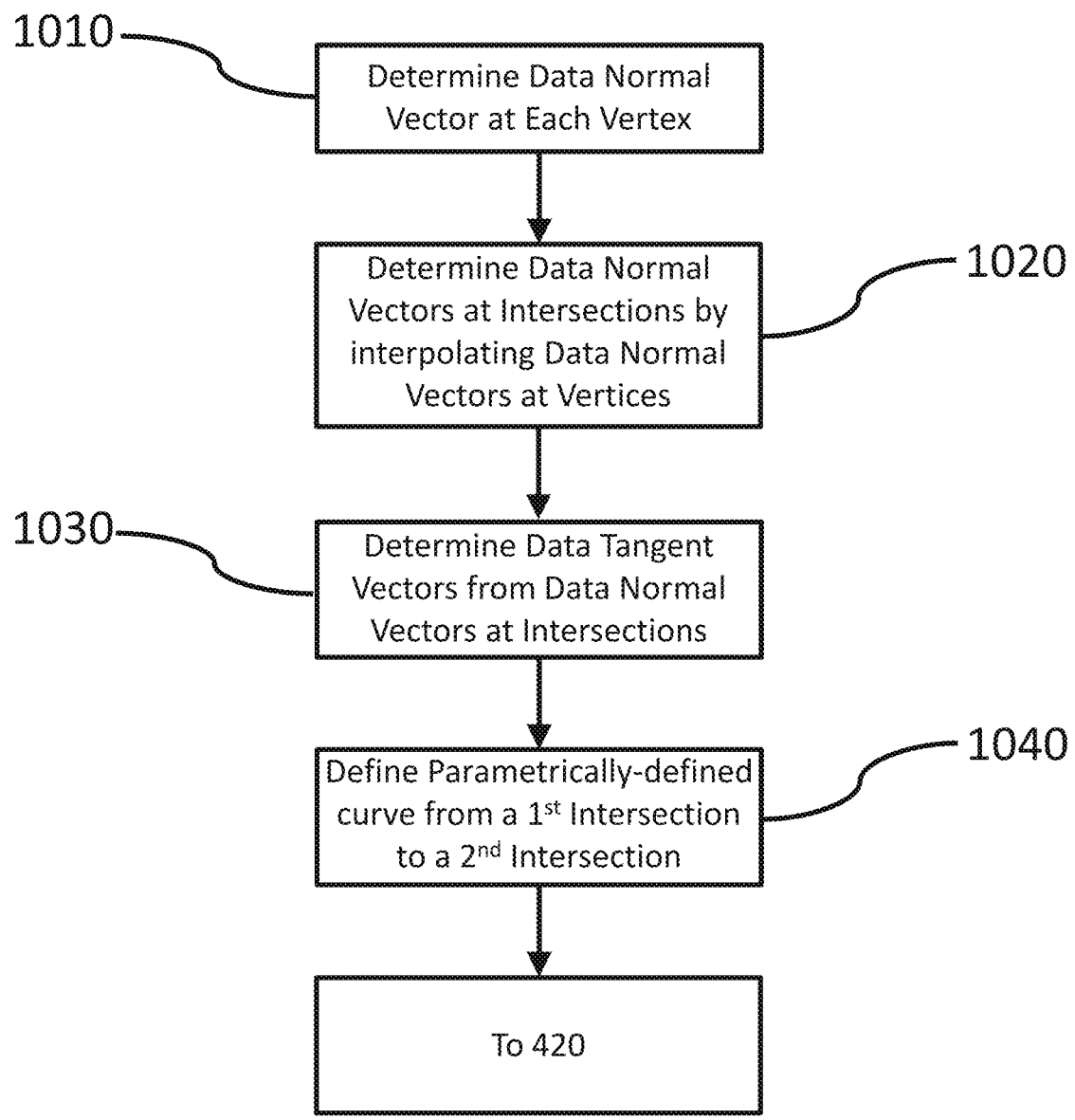
FIG. 10 illustrates a detailed flow of an example method for creating parametrically-defined curves.
Figure 11:
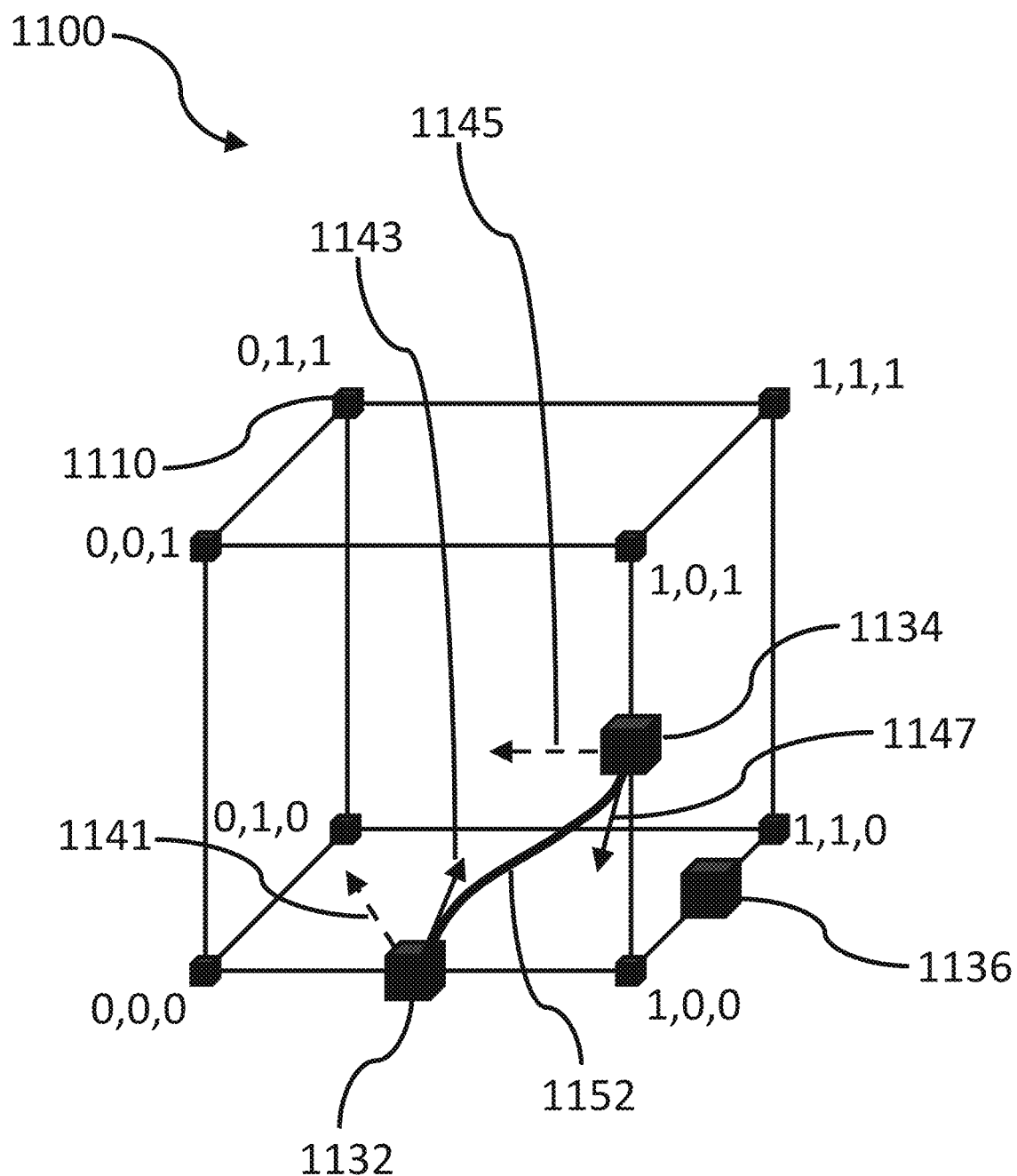
FIG. 11 illustrates a graphical interpretation of parametrically-defined curve creation.

FIG. 10 illustrates a detailed flow of an example method for creating a parametrically-defined curve for an isosurface shown by way of example in FIG. 11. Normal vectors are determined at vertices 1110 (<0,0,0>, <1,0,0>, <0,1,0>, <0,0,1>, <1,1,0>, <1,0,1>, <0,1,1>, <1,1,1>) of cell 1100 of the lattice from data values according to action 1010. First and second intersection normal vectors 1141 and 1145 are interpolated from adjacent vertices 1110 <0,0,0>, <1,0,0> and <1,0,1> of the data lattice at 1020.

The first intersection tangent vector 1143 is formed by projecting first intersection normal vector 1141 onto the face defined between the vertices <0,0,0>, <1,0,0>, <1,0,1> and <0,0,1> at 1030. The length of the normal vector of the face is computed and multiplied by the product of the length of first intersection normal vector 1141 with the cosine of the angle between intersection normal vector 1141 and the face normal. First intersection tangent vector 1143 is equal to the difference between first intersection normal vector 1141 and the face normal. First intersection tangent vector 1143 may be resized by scaling with a constant to allow a user or a heuristic to shape the parametric curve derived therefrom. The second intersection tangent vector 1147 is formed by projecting the second intersection normal vector 1145 onto the same face. This is accomplished with similarity to formation of first intersection tangent vector 1143.

Cases of intersection include no intersection tangent pair, one intersection tangent pair or more than one intersection tangent pair. In some instances, intersection tangent pairs may share an intersection point such that, for example, two intersection tangent pairs are defined by three intersection points. A cell having more than one intersection tangent pair may require further subdivision to be effectively smoothed and incorporated into a graphical output.

The parametrically-defined curve 1152 defined at 1040, traces a path from the first intersection point 1132, from the direction of the first intersection tangent vector 1143 to the second intersection point 1134 in the direction of the section intersection tangent vector 1147. Additional curves 1154 and 1156 (FIG. 12) are similarly formed between additional points of intersection 1132, 1134 and 1136 of edges of the cell 1100 under consideration so as to form a loop of curves.

Figure 12:
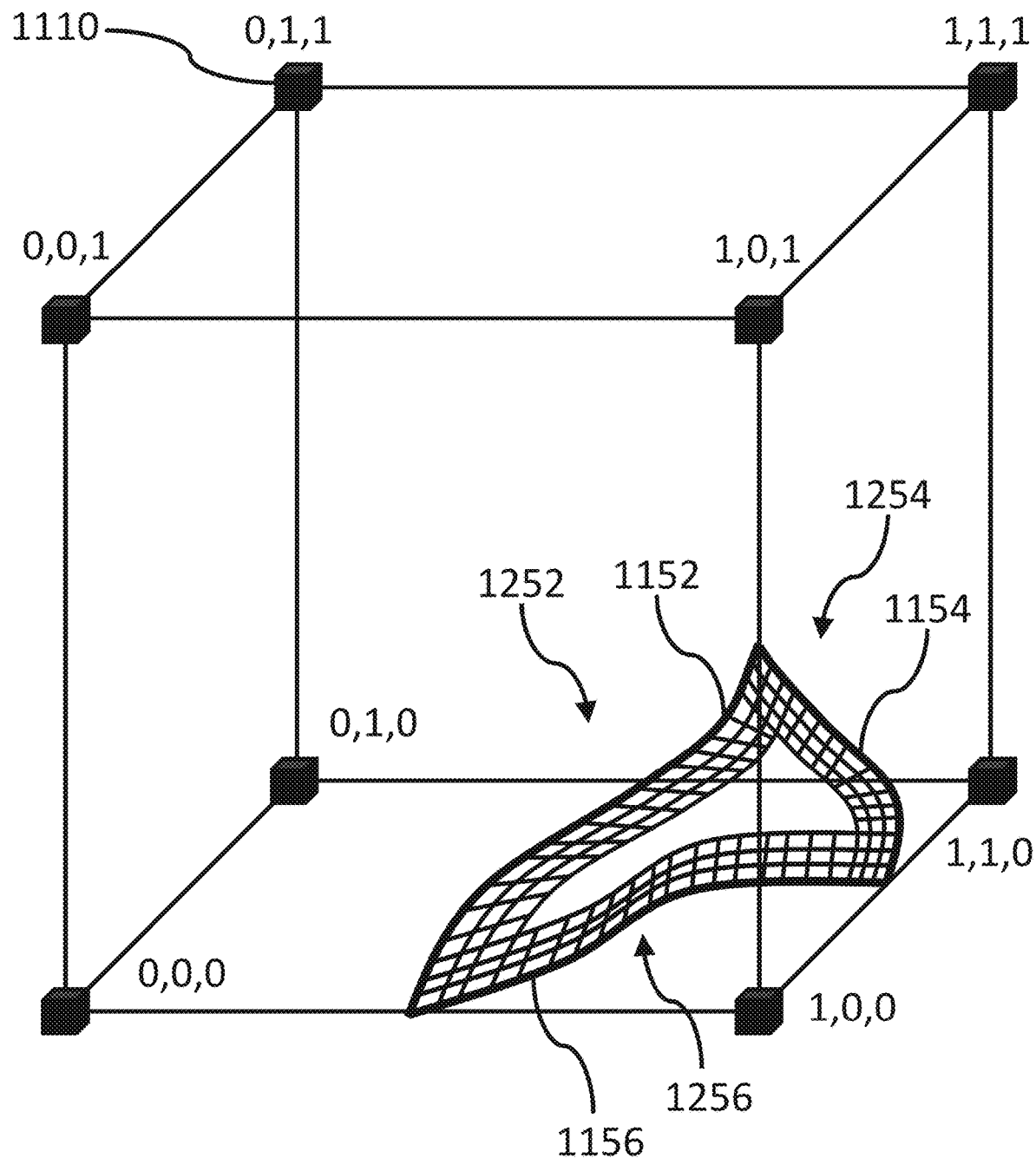
FIG. 12 illustrates a graphical interpretation of ribbon creation form a loop of parametrically-defined curves.

With a loop of curves so assembled, the method may proceed with ribbon formation as described in greater detail with reference to FIGS. 4, 5 and/or 6. FIG. 12 illustrates a graphical interpretation of ribbon creation from a loop of curves 1152, 1154 and 1156 parametrically-defined in accordance with points of intersection 1132, 1134 and 1136 of an isosurface with edges of cell 1100 of a data lattice.

Figure 13:
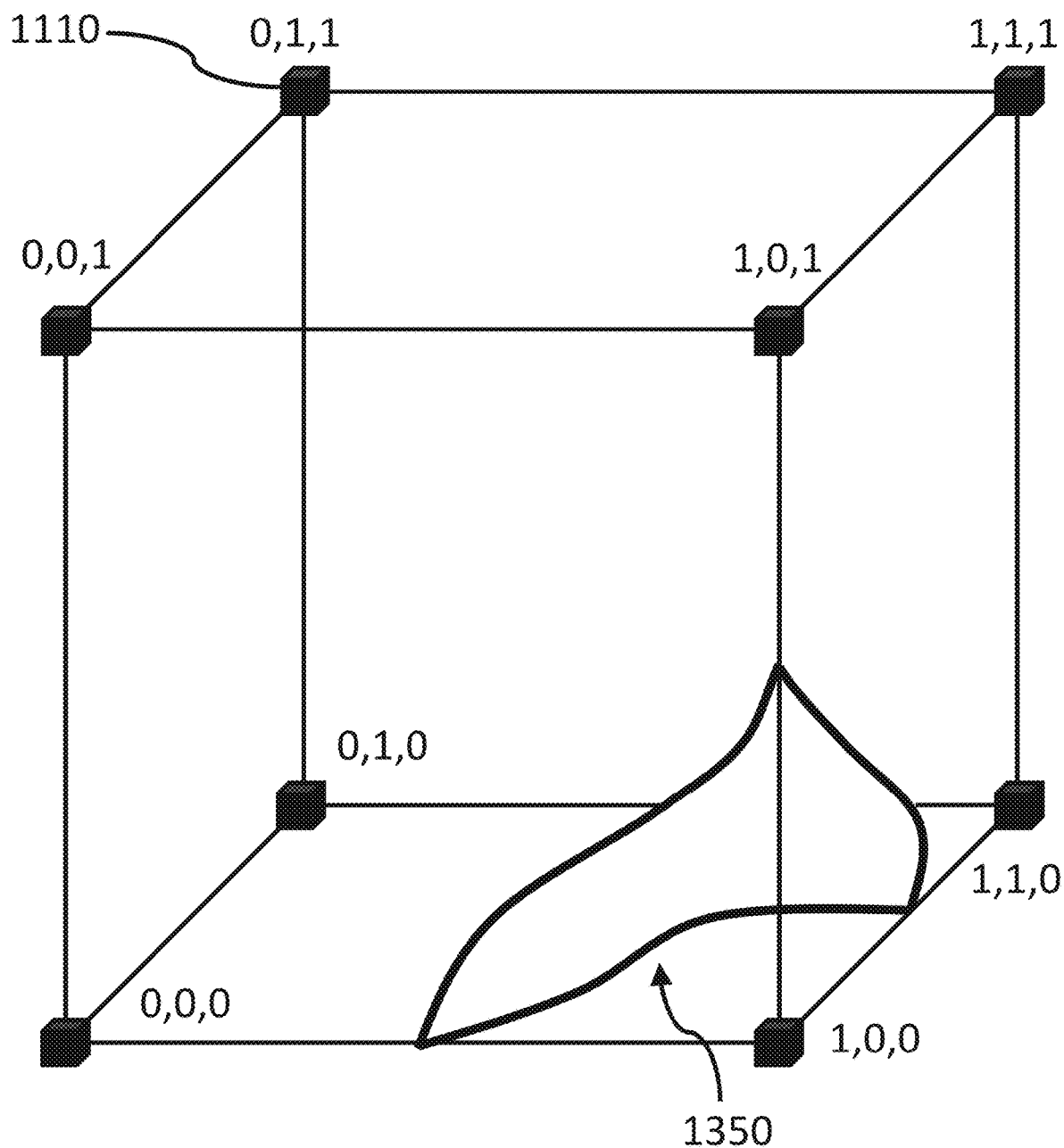
FIG. 13 illustrates a graphical interpretation a blended loop of ribbons.

After formation of ribbons 1252, 1254 and 1256, the method may proceed with blending the loop of ribbons 1252, 1254 and 1256 into a multi-sided surface patch as described above with reference to FIG. 4 and action 430. FIG. 13 illustrates a graphical interpretation of a multi-sided surface patch 1350 representing a segment of an isosurface intersecting cell 1100.

Each of the plurality of loops described with reference to FIGS. 10-12 may be formed directly from an input lattice of data values arranged in a plurality of interconnected cells having faces defined between edges of the lattice or the plurality of loops may be formed from a polyhedral mesh derived from the input lattice of data arranged in a plurality of interconnected cells having faces defined between edges of the lattice. This enables more accurate representation of corners and/or edges which may be undesirably smoothed away in processes using lattice edges as the polyhedral mesh.

Figure 14:
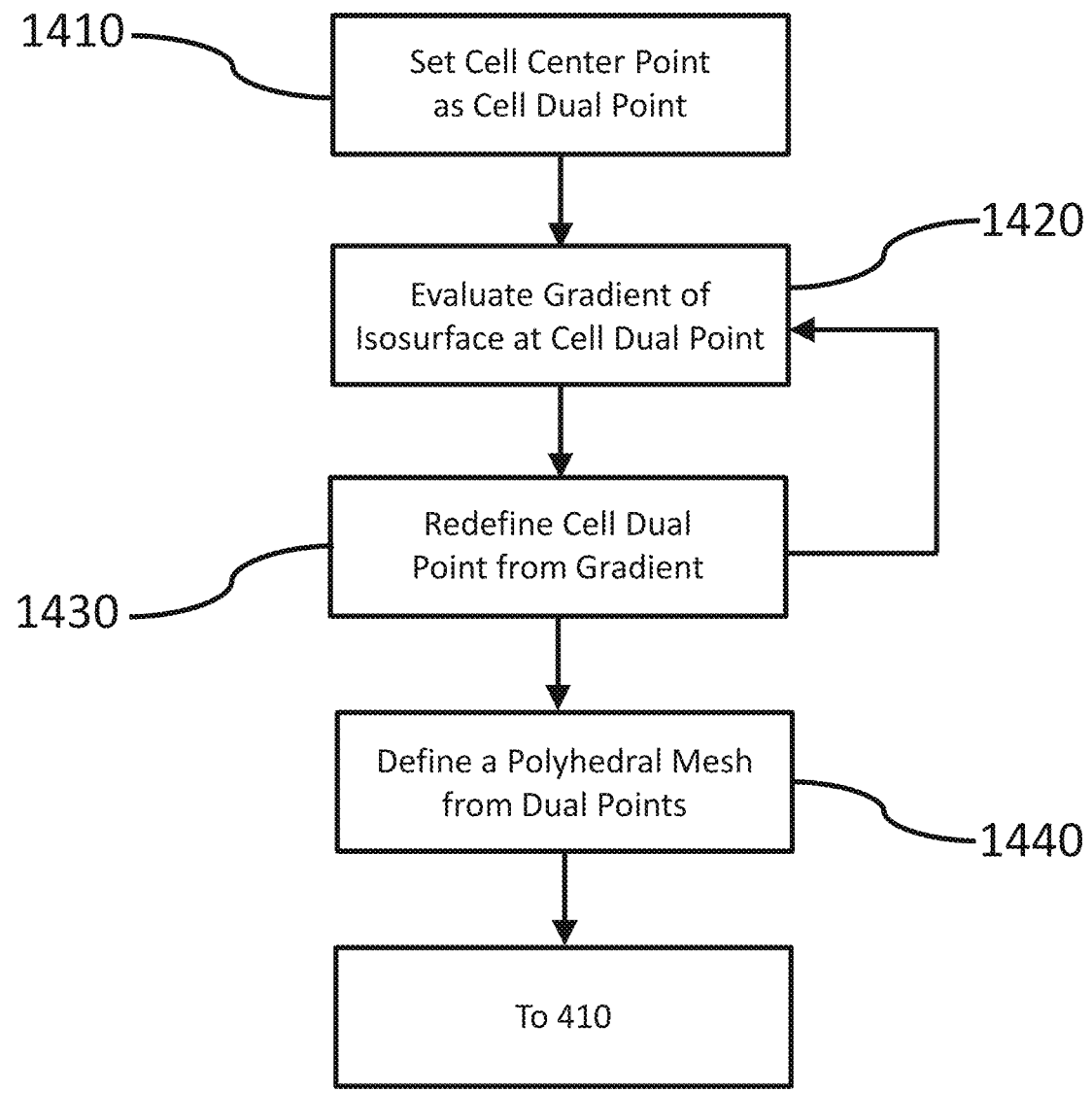
FIG. 14 illustrates a detailed flow of an example method for creating a polyhedral mesh from a lattice of data values.

FIG. 14 illustrates a detailed flow of an example method for creating a polyhedral mesh from a lattice of data values which mesh may then be used to produce multi-sided surface patches as described in greater detail with reference to FIGS. 4, 5 and/or 6. For each edge intersected by the isosurface, a dual point is located for each cell including the intersected edge. Each pair of adjacent dual points is interconnected with a polyhedral edge curve.

Figure 15:
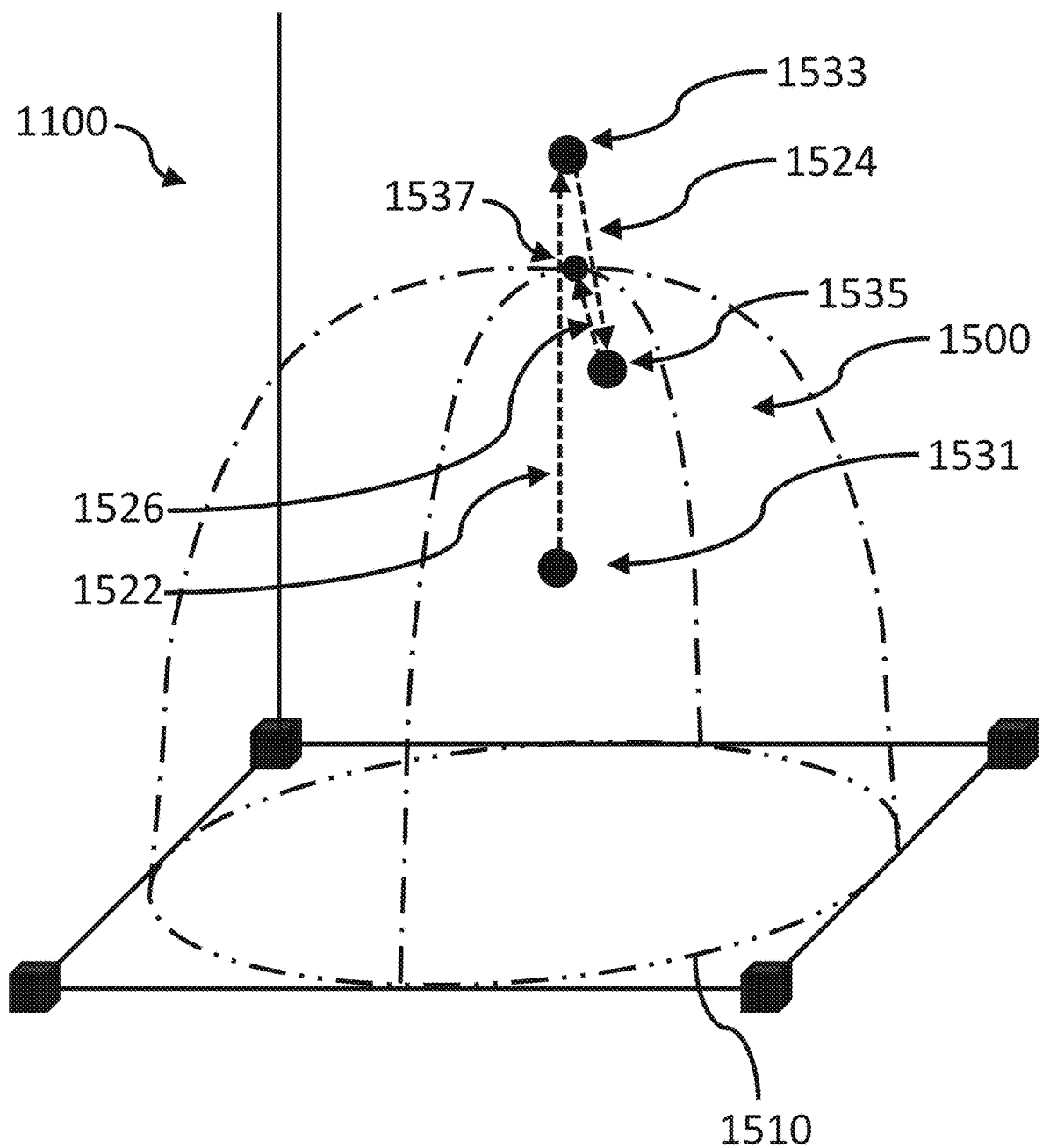
FIG. 15 illustrates a graphical interpretation of an example dual point location algorithm.

Referring additionally to FIG. 15 wherein the example isosurface is a paraboloid 1500 intersecting a plane/face defined between vertices <0,0,0>, <1,0,0>, <1,1,0> and <0,1,0> at ellipse 1510, cell dual point 1537 is located by initially setting a center point 1531 of cell 1100 as the cell dual point according to action 1410, evaluating a gradient 1522 of the isosurface at the cell dual point 1531 to reveal an end point 1533 at 1420 and, at 1430, resetting the end point 1533 of the gradient as the cell dual point for that cell. After a series of iterations from center point 1531 along paths 1522, 1524 and 1526 through points 1533 and 1535 a dual point 1537 is located on the isosurface.

Figure 16:
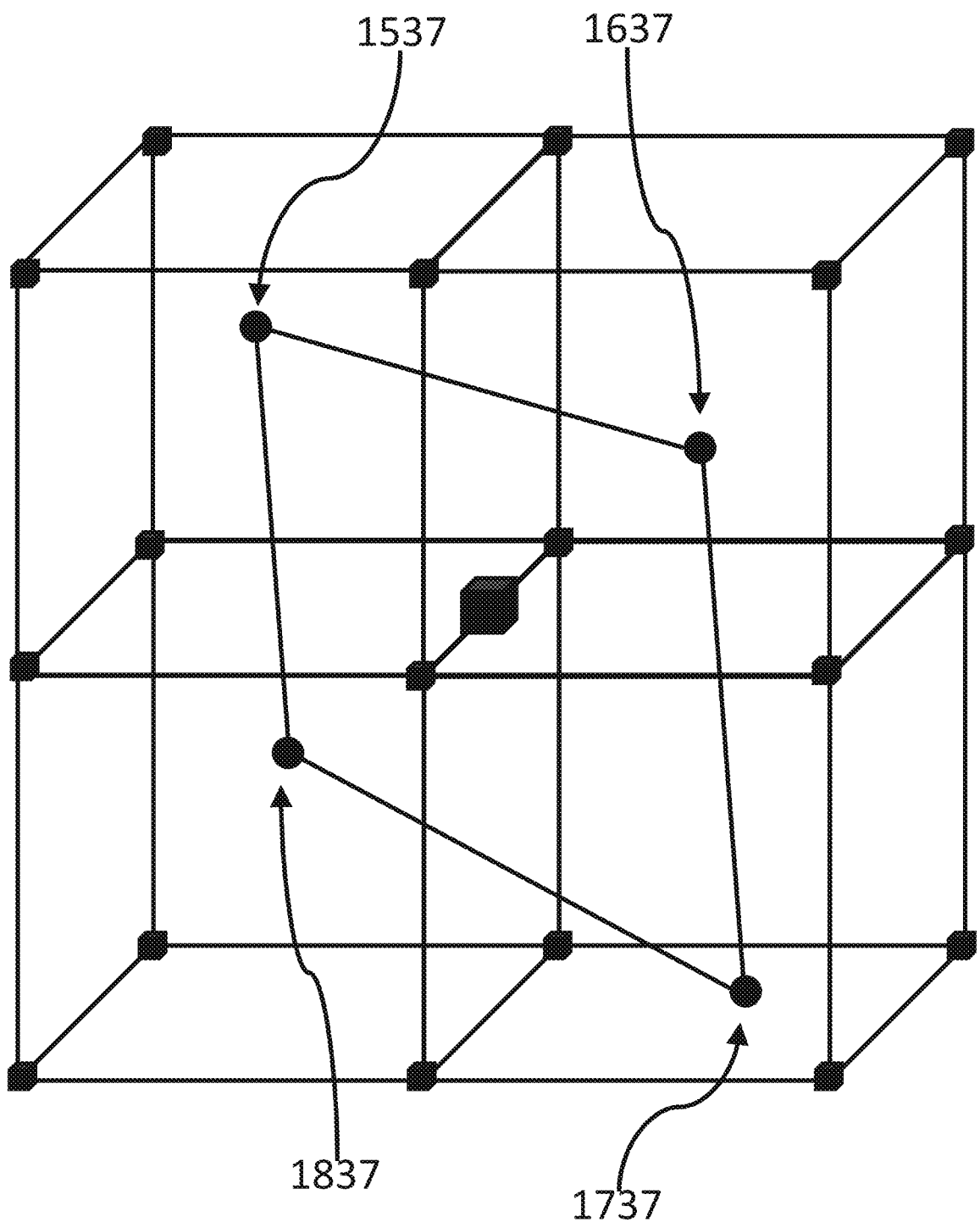
FIG. 16 illustrates a graphical interpretation of an example polygonal component of a polyhedral mesh.

Pairs of adjacent dual points 1537 and 1637, 1637 and 1737, 1737 and 1837 and 1837 and 1537 (FIG. 16) are interconnected with polyhedral edge curves at 1440 to yield a polygonal shape. The polyhedral mesh is a grouping of such polygonal shapes into a network such as that illustrated by way of example in FIG. 8.

With the polyhedral mesh defined, a smooth, graphic model of the isosurface representing a threshold data value may be pursued in accordance with action 410 (FIG. 4).

A system for smoothing a graphic model of an isosurface representing a threshold data value may resemble the system described above with reference to FIG. 9 and includes a memory, a processor 911 operatively coupled with the memory, a curve network module provided to the memory, a lofting module provided to the memory and a blending module provided to the memory.

The curve network module, when executed by processor 911, is configured to form a loop from a plurality of parametrically defined curves. The curve network module, in addition to being configured to form the loop from a polyhedral mesh of the graphic model as described with reference to FIG. 9 and the method described with reference to FIG. 4 of may also be configured to form each of the plurality of loops from an input lattice of data values arranged in a plurality of interconnected cells having faces defined between edges of the lattice.

The curve network module is configured to construct each of the plurality of parametrically defined curves in accordance with processes described above with reference to FIGS. 10 & 11 from a first point of intersection of an edge by the isosurface along a first direction defined by a first intersection tangent vector to a second, neighboring point of intersection of an edge by the isosurface along a second direction defined by a second intersection tangent vector.

The curve network module forms the first intersection tangent vector by determining a first intersection normal vector at the first point of intersection and projecting the first intersection normal vector onto the face defined between the intersected edges.

An intersection normal vector n is determined by interpolating between normals at the adjacent vertices $n_0$, $n_1$:

$$n=(1-t)*n_0+t*n_1$$

The intersection normal vector, n, is projected onto a face having normal $n_f$:

The length of $n_f$, $n_{f\text{-}norm}$, is computed. The projection, $n_{f1}$, is computed as $a_1*n_{f\text{-}norm}$ where $a_1=\|n\|\cos(\theta)$ for $\theta$ formed by n and $n_f$.

The intersection tangent vector, T, is a projection of n onto the face to which $n_f$ is normal: $T=n-n_f$.

T may be resized with a constant k as $T_{new}=k*T$

The curve network module forms the second intersection tangent vector by determining a second intersection normal vector at the second point of intersection and projecting the second intersection normal vector onto the face defined between the intersected edges.

The lofting module described above with reference to FIG. 9, when executed by processor 911, is configured to, for each curve of the loop, create a ribbon along each curve of the loop (FIG. 12) by interpolating between the preceding curve of the loop and the subsequent curve of the loop. Alternatively, as also described above, the lofting module may form a ribbon fiber as described with reference to and sweep the ribbon fiber along the base curve to yield a ribbon.

The blending module described above with reference to FIG. 9, when executed by processor 911, is configured to blend the ribbons to form a multi-sided surface patch between the parametrically defined curves (FIG. 13).

As an alternative, the curve network module may be configured to form each of the plurality of loops from a polyhedral mesh derived from an input lattice of data values arranged in a plurality of interconnected cells having faces defined between edges of the lattice rather than directly from the input lattice.

A polyhedral mesh module is configured to derive the polyhedral mesh. For each edge intersected by the isosurface, a dual point is located for each cell including the intersected edge in accordance with processes described above with reference to FIGS. 14 & 15. Each pair of adjacent dual points is interconnected with a polyhedral edge curve.

The polyhedral mesh module is configured to locate the cell dual point by setting a center point of the cell as the cell dual point, evaluating a gradient of the isosurface at the cell dual point to reveal an end point and resetting the end point of the gradient as the cell dual point for that cell.

The following represents an example algorithm which may be implemented by the polyhedral mesh module, for example, in accordance with instructions written in Python code.

The polyhedral mesh module is configured to define the cell as a cubic function:

var('a0, a1, a2, a3, a4, a5, a6, a7')

```
a0=v000
a1=-v000+v100
a2=-v000+v010
a3=-v000+v001
a4=v000-v010-v100+v110
a5=v000-v001-v100+v101
a6=v000-v001-v010+v011
a7=-v000+v001+v010-v011+v100-v101-v110+v111
var('x, y, z')
def Fcub(x,y,z, a0, a1, a2, a3, a4, a5, a6, a7):
   return a0+a1*x, +a2*y+a3*z+a4*x*y, +a5*x*z, +a6*y*z,
      +a7*x*y*z
```

The components of a gradient of the cubic function are then computed in accordance with a configuration of the polyhedral mesh module:

```
Def DxFcub(x,y,z, a1, a4, a5, a7)
Return a1, +a4*y+a5*z+a7*y*z
DyFcub(x,y,z, a2, a4, a6, a7)
Return a2, +a4*x, +a6*z, +a7*x*z
DzFcub(x,y,z, a3, a5, a6, a7)
Return a3, +a5*x, +a6*y, +a7*x*y
```

The polyhedral mesh module is configured to establish the dual point of the cell:

```
var('u, x0, x1, y0, y1, z0, z1')
x0=0.5; y0=0.5; z0=0.5 #Center of cell
sign=-1
g=Graphics( )
while abs(Fcub(x0,y0,z0, a0, a1, a2, a3, a4, a5, a6,
a7))>0.05: #Draw streamline
   norm=sqrt(DxFcub(x0,y0,z0, a1, a4, a5, a7)^2
      +DyFcub(x0,y0,z0, a2, a4, a6, a7)^2
      +DzFcub(x0,y0,z0, a3, a5, a6, a7)^2)
   print(norm)
   if norm<0.01: break
   x1=x0+0.05*sign*DxFcub(x0,y0,z0, a1, a4, a5, a7)/norm
   y1=y0+0.05*sign*DyFcub(x0,y0,z0, a2, a4, a6, a7)/norm
   z1=z0+0.05*sign*DzFcub(x0,y0,z0, a3, a5, a6, a7)/norm
   print(x1, y1, z1)
      if abs(Fcub(x0,y0,z0, a0, a1, a2, a3, a4, a5, a6, a7))
         <abs(Fcub(x1,y1,z1, a0, a1, a2, a3, a4, a5, a6, a7)):
         sign*=-11
      g+=parametric_plot(((1.0-u)*x0+u*x1    (1.0-u)*y0+
         u*y1 (1.0-u)*z0+u*z1),
      (u,0,1), color='red', thickness=3)
      x0=x1; y0=y1; z0=z1
```

In an example, the algorithm step size used for each iteration is 0.05 and converges to a sufficiently accurate dual point within three iterations.

The polyhedral mesh module joins dual points surrounding an intersected edge by polyhedral edge curves to yield a polygonal shape surrounding the intersected edge. As suggested above, the resulting polyhedral mesh may be used by the curve network module to produce a network of parametric curve loops.

The disclosure further seeks to provide a computer program product or software product including a non-transitory or non-transient computer-readable storage medium storing computer-executable code for graphical modelling by smoothing polyhedral meshes with multi-sided patches. The code, when executed, is configured to perform the actions 410 to 440, 510 to 560 and 610 to 660 of the method as described in conjunction with FIGS. 4-6 as well as the actions 1010-1040 and 14020-1440 of FIGS. 10 & 14 in accordance with modules of the systems described above. As actions of the disclosed methods may be provided in different sequences, so the computer-executable code may be configured to provide a service having a different sequence of actions from those illustrated in FIGS. 4-6, 10 and 14. In some examples, the computer program product and code thereof may be downloaded from a software application store, for example, from an "App store", to a data processing unit.

In an example, a non-transitory computer readable medium for smoothing a graphic model comprises computer readable instructions which, when executed by a processor, cause one or more computers to form each of a plurality of loops from a plurality of parametrically defined curves, create a ribbon along each parametrically defined curve between its preceding parametrically defined curve of the loop and a subsequent parametrically defined curve of the loop. The ribbons are then blended to form a multi-sided patch from each of the plurality of loops.

The instructions may cause the one or more computers to form the loop based upon a polyhedral mesh of the graphic model and blend the ribbons by computing a weighted sum of the ribbons.

The computer readable instructions may cause the one or more computers to form each of the plurality of loops from an input lattice of data values arranged in a plurality of interconnected cells having faces defined between edges of the lattice.

The computer readable instructions may cause the one or more computers to construct each of the plurality of parametrically defined curves from a first point of intersection of an edge by the isosurface along a first direction defined by a first intersection tangent vector to a second, neighboring point of intersection of an edge by the isosurface along a second direction defined by a second intersection tangent vector.

The computer readable instructions may be further configured to cause the one or more computers to form the first intersection tangent vector by determining a first intersection normal vector at the first point of intersection and projecting the first intersection normal vector onto the face defined between the intersected edges and form the second intersection tangent vector by determining a second intersection normal vector at the second point of intersection and projecting the second intersection normal vector onto the face defined between the intersected edges.

The computer readable instructions may cause one or more computers to form the plurality of loops from a polyhedral mesh derived according to the process described with reference to FIG. 15 from an input lattice of data values arranged in a plurality of interconnected cells having faces defined between edges of the lattice.

The computer readable instructions may be further configured to cause one or more computers to derive the polyhedral mesh by locating a dual point for each cell including a given intersected edge and interconnect each adjacent pair of dual points with a polyhedral edge curve. The cell dual point may be located by the one or more computers setting a center point of the cell as the cell dual point, evaluating a gradient of the isosurface at the cell dual point to reveal an end point and resetting the end point of the gradient as the cell dual point for that cell.

It will be appreciated that features of the disclosure are susceptible to being combined in various combinations without departing from the scope of the disclosure as defined by the appended claims.

Embodiments of the disclosure are susceptible to being used for various purposes, including, though not limited to, enabling users to smooth graphic models with higher fidelity and less processing power. Systems and methods are provided for starting from a commonly used input polyhedral mesh, or a cage, and producing a 3D graphics model of a smooth surface that approximates the cage. Disclosed systems and methods generate smoother surfaces with curvature continuity and eliminate troublesome extraordinary points and their plethora of patches. Disclosed systems and methods are well-suited for implementation on mobile devices because of the small database and propitious calculation forms.

Modifications to embodiments of the disclosure described in the foregoing are possible without departing from the scope of the disclosure as defined by the accompanying claims. Expressions such as "including", "comprising", "incorporating", "consisting of", "have", "is" used to describe and claim the disclosure are intended to be construed in a non-exclusive manner, namely allowing for items, components or elements not explicitly described also to be present. Reference to the singular is also to be construed to relate to the plural.

What is claimed is:

1. A method for creating a continuous 3D model and smooth isosurfaces from discrete data, comprising:
    for an input lattice of data values arranged in a plurality of interconnected cells having faces defined between edges of the lattice, forming each of a plurality of loops from a plurality of parametrically defined curves constructed from a first point of intersection of an edge by an isosurface along a first direction defined by a first intersection tangent vector to a second, neighboring point of intersection of an edge by the isosurface along a second direction defined by a second intersection tangent vector;
    creating a ribbon along each parametrically defined curve between its preceding parametrically defined curve and its subsequent parametrically defined curve; and
    blending the ribbons to form a multi-sided surface patch from each of the plurality of loops.

2. The method as set forth in claim 1, wherein the first intersection tangent vector is formed by determining a first intersection normal vector at the first point of intersection and projecting the first intersection normal vector onto the face defined between the intersected edges; and
    the second intersection tangent vector is formed by determining a second intersection normal vector at the second point of intersection and projecting the second intersection normal vector onto the face defined between the intersected edges.

3. A system for creating a continuous 3D model and smooth isosurfaces from discrete data, comprising:
    a memory;
    a processor operatively coupled with the memory;
    a curve network module provided to the memory which, when executed by the processor, is configured to, for an input lattice of data values arranged in a plurality of interconnected cells having faces defined between edges of the lattice, form each of a plurality of loops from a plurality of parametrically defined curves constructed from a first point of intersection of an edge by an isosurface along a first direction defined by a first intersection tangent vector to a second, neighboring point of intersection of an edge by the isosurface along a second direction defined by a second intersection tangent vector;
    a lofting module provided to the memory which, when executed by the processor, is configured to create a ribbon along each parametrically defined curve between its preceding parametrically defined curve and its subsequent parametrically defined curve; and
    a blending module provided to the memory which, when executed by the processor, is configured to blend the ribbons to form a multi-sided surface patch from each of the plurality of loops.

4. The system as set forth in claim 3, wherein the curve network module is configured to form the first intersection tangent vector by determining a first intersection normal vector at the first point of intersection and projecting the first intersection normal vector onto the face defined between the intersected edges; and
    is configured to form the second intersection tangent vector by determining a second intersection normal vector at the second point of intersection and projecting the second intersection normal vector onto the face defined between the intersected edges.

5. A non-transitory computer readable medium for creating a continuous 3D model and smooth isosurfaces from discrete data, comprising computer readable instructions which, when executed by a processor, cause one or more computers to:
    for an input lattice of data values arranged in a plurality of interconnected cells having faces defined between edges of the lattice, form each of a plurality of loops from a plurality of parametrically defined curves constructed from a first point of intersection of an edge by an isosurface along a first direction defined by a first intersection tangent vector to a second, neighboring point of intersection of an edge by the isosurface along a second direction defined by a second intersection tangent vector;
    create a ribbon along each parametrically defined curve between its preceding parametrically defined curve of and its subsequent parametrically defined curve; and
    blend the ribbons to form a multi-sided surface patch from each of the plurality of loops.

6. The non-transitory computer readable medium as set forth in claim 5, wherein the computer readable instructions configured to cause the one or more computers to construct each of the plurality of parametrically defined curves are further configured to:
    cause the one or more computers to form the first intersection tangent vector by determining a first intersection normal vector at the first point of intersection and projecting the first intersection normal vector onto the face defined between the intersected edges; and
    cause the one or more computers to form the second intersection tangent vector by determining a second intersection normal vector at the second point of intersection and projecting the second intersection normal vector onto the face defined between the intersected edges.

7. A method for creating a continuous 3D model and smooth isosurfaces from discrete data, comprising:
    for an input lattice of data arranged in a plurality of interconnected cells having faces defined between edges of the lattice, deriving a polyhedral mesh by:
        for each edge intersected by the isosurface, locating a dual point of each cell including the intersected edge; and
        interconnecting each pair of adjacent dual points with a polyhedral edge curve;
    forming each of a plurality of loops from a plurality of parametrically defined curves defined from the polyhedral mesh;
    creating a ribbon along each parametrically defined curve between its preceding parametrically defined curve and its subsequent parametrically defined curve; and blending the ribbons to form a multi-sided surface patch from each of the plurality of loops.

8. The method as set forth in claim 7, further comprising locating the cell dual point by:
   setting a center point of the cell as the cell dual point;
   evaluating a gradient of the isosurface at the cell dual point; and
   evaluating a difference between the cell dual point and a scale of the gradient; and
   resetting the difference as the cell dual point for that cell.

9. A system for creating a continuous 3D model and smooth isosurfaces from discrete data, comprising:
   a memory;
   a processor operatively coupled with the memory;
   a polyhedral mesh module provided to the memory which, when executed by the processor, is configured to, for an input lattice of data arranged in a plurality of interconnected cells having faces defined between edges of the lattice, derive a polyhedral mesh by, for each edge intersected by an isosurface, locating a dual point of each cell including the intersected edge and interconnecting each pair of adjacent dual points with a polyhedral edge curve;
   a curve network module provided to the memory which, when executed by the processor, is configured to form each of a plurality of loops from a plurality of parametrically defined curves defined from the polyhedral mesh;
   a lofting module provided to the memory which, when executed by the processor, is configured to create a ribbon along each parametrically defined curve between its preceding parametrically defined curve and its subsequent parametrically defined curve; and
   a blending module provided to the memory which, when executed by the processor, is configured to blend the ribbons to form a multi-sided surface patch from each of the plurality of loops.

10. The system as set forth in claim 9, wherein the polyhedral mesh module is configured to locate the cell dual point by:
   setting a center point of the cell as the cell dual point;
   evaluating a gradient of the isosurface at the cell dual point; and
   evaluating a difference between the cell dual point and a scale of the gradient;
   resetting the difference as the cell dual point for that cell.

11. A non-transitory computer readable medium for creating a continuous 3D model and smooth isosurfaces from discrete data, comprising computer readable instructions which, when executed by a processor, cause one or more computers to:
   for an input lattice of data values arranged in a plurality of interconnected cells having faces defined between edges of the lattice, derive a polyhedral mesh by:
      for each edge intersected by an isosurface, locating a dual point of each cell including the intersected edge; and
      interconnecting each pair of adjacent dual points with a polyhedral edge curve;
   form each of a plurality of loops from a plurality of parametrically defined curves defined from the polyhedral mesh;
   create a ribbon along each parametrically defined curve between its preceding parametrically defined curve of and its subsequent parametrically defined curve; and
   blend the ribbons to form a multi-sided surface patch from each of the plurality of loops.

12. The non-transitory computer readable medium as set forth in claim 11, wherein the computer readable instructions configured to cause one or more computers to form each of the plurality of loops are further configured to cause the one or more computers to locate the cell dual point by:
   setting a center point of the cell as the cell dual point;
   evaluating a gradient of the isosurface at the cell dual point;
   evaluating a difference between the cell dual point and a scale of the gradient; and
   resetting the difference as the cell dual point.

* * * * *